(12) United States Patent
Wada et al.

(10) Patent No.: US 8,194,521 B2
(45) Date of Patent: Jun. 5, 2012

(54) OPTICAL DISC DEVICE, VIDEO REPRODUCING APPARATUS, SERVER, CAR NAVIGATION SYSTEM USING THE OPTICAL DISC DEVICE, INTEGRATED CIRCUIT AND RECORDING/REPRODUCING METHOD

(75) Inventors: Hidenori Wada, Kyoto (JP); Yoshiaki Komma, Osaka (JP); Takeshi Shimamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 161 days.

(21) Appl. No.: 12/740,721

(22) PCT Filed: Aug. 26, 2009

(86) PCT No.: PCT/JP2009/004133
§ 371 (c)(1),
(2), (4) Date: Apr. 30, 2010

(87) PCT Pub. No.: WO2010/023901
PCT Pub. Date: Mar. 4, 2010

(65) Prior Publication Data
US 2010/0260488 A1 Oct. 14, 2010

(30) Foreign Application Priority Data
Sep. 1, 2008 (JP) .................... 2008-223124

(51) Int. Cl.
*G11B 7/00* (2006.01)
(52) U.S. Cl. ............... 369/112.01; 369/112.03; 369/94
(58) Field of Classification Search ............ 369/112.01, 369/112.02, 112.03, 112.23, 94, 44.26, 44.23, 369/44.24, 112.07
See application file for complete search history.

(56) References Cited

U.S. PATENT DOCUMENTS

| | | | |
|---|---|---|---|
| 6,587,409 B1 | 7/2003 | Yamazaki et al. | |
| 6,954,417 B2 * | 10/2005 | Komma et al. | 369/112.02 |
| 7,012,875 B2 | 3/2006 | Shimano et al. | |
| 7,283,439 B2 | 10/2007 | Shimano et al. | |

(Continued)

FOREIGN PATENT DOCUMENTS

JP  9-115146  5/1997

(Continued)

*Primary Examiner* — Nabil Z Hindi
(74) *Attorney, Agent, or Firm* — Wendertoth, Lind & Ponack, L.L.P.

(57) ABSTRACT

An optical disc device is provided with an optical head including a light source, a condensing optical system including an objective lens for receiving a light beam emitted from the light source and forming a microspot on a multilayer optical recording medium, a photodetector for receiving the light beam reflected by the multilayer optical recording medium and outputting an electrical signal corresponding to the amount of light and a coma aberration correcting element for correcting a coma aberration of the condensing optical system, and a processing circuit for controlling the condensing optical system and the coma aberration correcting element. The processing circuit controls the condensing optical system and the coma aberration correcting element so that the correction of the coma aberration from a value suitable for a first recording layer to a value specified for a second recording layer is started before a movement of a focus position of the microspot from the first recording layer to the second recording layer is completed.

19 Claims, 16 Drawing Sheets

U.S. PATENT DOCUMENTS

| | | | |
|---|---|---|---|
| 7,843,774 B2 * | 11/2010 | Nagura | 369/44.23 |
| 2002/0027842 A1 | 3/2002 | Komma et al. | |
| 2003/0007431 A1 | 1/2003 | Tateishi | |
| 2003/0053393 A1 | 3/2003 | Shimano et al. | |
| 2004/0264311 A1 | 12/2004 | Komma et al. | |
| 2004/0264312 A1 | 12/2004 | Komma et al. | |
| 2006/0056276 A1 | 3/2006 | Shimano et al. | |
| 2006/0158993 A1 | 7/2006 | Komma et al. | |
| 2006/0158994 A1 | 7/2006 | Komma et al. | |
| 2006/0181985 A1 | 8/2006 | Komma et al. | |
| 2009/0116346 A1 | 5/2009 | Takahashi et al. | |

FOREIGN PATENT DOCUMENTS

| | | |
|---|---|---|
| JP | 10-143873 | 5/1998 |
| JP | 11-191222 | 7/1999 |
| JP | 11-316954 | 11/1999 |
| JP | 2000-339731 | 12/2000 |
| JP | 2002-157750 | 5/2002 |
| JP | 2003-22545 | 1/2003 |
| JP | 2007-265578 | 10/2007 |
| JP | 2007-317293 | 12/2007 |
| WO | 02/21520 | 3/2002 |
| WO | 2007/114030 | 10/2007 |

* cited by examiner

OPTICAL DISC DEVICE, VIDEO REPRODUCING APPARATUS, SERVER, CAR NAVIGATION SYSTEM USING THE OPTICAL DISC DEVICE, INTEGRATED CIRCUIT AND RECORDING/REPRODUCING METHOD

TECHNOLOGICAL FIELD

The present invention relates to an optical disc device and a recording/reproducing method for recording or reproducing information on or from a multilayer optical recording medium, an integrated circuit used in this optical disc device, and a video reproducing apparatus, a server and a navigation system using this optical disc device.

BACKGROUND ART

In recent years, attention has been focused on digital versatile discs (DVDs) as large-capacity optical recording media since digital information can be recorded at about six times as high a recording density as compared with compact discs (CDs). Particularly, in the case of reproducing/recording information on/from a high-density optical recording medium such as a DVD, it is necessary to shorten the wavelength of laser light and increase a numerical aperture (NA) of an objective lens in order to reduce a beam spot diameter of a laser beam. As a result, the optical recording medium comes to have a smaller margin for a tilt angle.

In order to increase a recording capacity, multilayer optical recording media each including a plurality of recording layers have been and are in widespread use. Here, reflectance may largely change between layers of a multilayer optical recording medium. Patent literature 1 discloses an optical disc player capable of stably performing a tilt servo even if a recording layer is changed during the reproduction from such an optical recording medium.

Here, an example of the above conventional optical disc player is described with reference to the drawing. FIG. 19 is a diagram showing the construction of a conventional optical disc player. In FIG. 19, identified by 171 is an optical disc, by 172 an optical head, by 173 a photodetector, by 174 a liquid crystal element, by 175 a motor, by 176 an Rf amplitude detector, by 177 a reproducing unit, by 178 a focus/tracking drive circuit, by 179 a liquid crystal drive circuit, by 1700 a focus servo unit, by 1701 a tracking servo unit, by 1702 a tilt servo unit and by 1703 a microcomputer.

The operation of the thus constructed optical disc player is described. The optical head 172 irradiates the optical disc with laser light, receives reflected light from the optical disc 171 and generates a signal corresponding to the amount of the received light. The optical disc 171 is rotated and driven by the motor 175. In the optical head 172, the liquid crystal element 174 for correcting an aberration in a disc radial direction is arranged on an optical axis of a light beam.

An output from the photodetector 173 is sent to the Rf amplitude detector 176, the focus servo unit 1700 and the tracking servo unit 1701. The focus servo unit 1700 feeds a control signal to the focus/tracking drive circuit 178 to focus a light beam emitted from the optical head 172 on a desired recording layer. Further, the tracking servo unit 1701 feeds a control signal to the focus/tracking drive circuit 178 so that a light beam emitted from the optical head is focused on a desired track on a desired recording layer. Here, the focus/tracking drive circuit 178 drives the optical head 172 to focus the light beam emitted from the optical head 172 on the desired track on the desired layer based on the above control signal.

The Rf amplitude detector 176 receives an Rf detection signal from the photodetector 173 and feeds the Rf amplitude signal to the tilt servo unit 1702. The tilt servo unit 1702 outputs a tilt drive signal to the liquid crystal drive circuit 179 using the Rf amplitude signal so as to maximize an envelop of the Rf amplitude signal, and the liquid crystal drive circuit 179 drives the liquid crystal element 174 based on this control signal. These controls are executed in accordance with a command from the microcomputer 1703.

Next, a time of an interlayer jump is thought. If an interlayer jump command is issued from the microcomputer 1703, the tilt servo unit 1702 retains and outputs a tilt drive value immediately before the jump. In other words, the tilt servo unit 1702 continues to output a constant value during the jump without depending on the intensity of the envelope during the jump. In this way, a situation of causing a reduction in a tilt control performance and losing the control can be avoided, wherefore a stable servo operation can be obtained.

Patent literatures 2, 3, 4 and 5 disclose the elaboration of a pulse or offset signal to be fed to a focus error signal to stably perform a focus control during the interlayer jump as described above.

However, in the optical disc player constructed as above, the interlayer jump in multilayer optical recording media having a higher density than DVDs become unstable. This is described in detail. First of all, an optical head is thought which records and reproduces information on and from a Blu-ray disc which is an optical recording medium having a higher density than DVDs. Since the optical head for recording and reproducing information on and from the Blu-ray disc includes a light source having a wavelength of about 405 nm and an objective lens having a very large aperture (about 0.85), base material thicknesses differ among the respective recording layers and the amounts of coma aberration largely differ even if an inclined amount is the same in the case of reproducing information from a multilayer optical recording medium including two or more recording layers using this optical head.

FIG. 20 is a construction diagram of a multilayer optical recording medium including three recording layers. As shown in FIG. 20, a three-layer optical disc 181 is composed of a base material 182, a first recording layer 183, a first intermediate layer 184, a second recording layer 185, a second intermediate layer 186, a third recording layer 187 and a protective layer 188 on the underside in this order from an optical head side 180. The base material 182 and the first and second intermediate layers 184, 186 are made of a transparent medium such as resin.

The first intermediate layer 184 is present between the first and second recording layers 183, 185 and the second intermediate layer 186 is present between the second and third recording layers 185, 187. Thus, the thickness from the surface of the optical disc 181 on the optical head side 180 to the second recording layer 185 is larger than the thickness from this surface to the first recording layer 183 only by the thickness of the intermediate layer 184, and the thickness of the surface of the optical disc 181 on the optical head side 180 to the third recording layer 187 is larger than the thickness from this surface to the second recording layer 185 only by the thickness of the intermediate layer 186.

Here, distances from the surface of the optical disc 181 on the optical head side 180 to the respective recording layers are called base material thicknesses of the respective recording layers. For the three-layer optical disc as shown in FIG. 20, there are cases where, when information is recorded or reproduced on or from the first recording layer 183 while a microspot of a light beam is focused on the first recording layer 183, the focus position of the microspot of the light beam is moved to the second recording layer 185 or conversely the focus position is moved from the second recording layer 185 to the first recording layer 183 to record or reproduce information on or from the second recording layer 185. An operation of moving the focus position to a different recording layer in this way is called an "interlayer jump" and, since there are three recording layers in the example shown in FIG. 20, other combinations also exist.

Here, if it is, for example, assumed that the respective base material thicknesses are 100 μm, 75 μm and 50 μm in a multilayer optical disc including three recording layers, coma aberrations created at the respective base material thicknesses are 100 mλ, 75 mλ and 50 mλ and largely differ when the optical disc is inclined by 1°. In the case of such a three-layer optical disc, if an objective lens is so moved as to focus a beam on a recording layer position as a destination of the interlayer jump with a tilt drive value immediately before the interlayer jump retained, i.e. with an optimal coma aberration correction amount maintained in the recording layer as a starting point of the interlayer jump when the above interlayer jump is performed, optimal coma aberration correction amounts differ among the respective recording layers as described above, wherefore the coma aberration of the recording layer as the destination of the interlayer jump cannot be corrected. As a result, a focus error signal is deteriorated, a focus lock-in operation in the recording layer as the destination of the movement of the focus position becomes unstable and a stable interlayer jump cannot be performed.

PRIOR ART LITERATURES

Patent Literature

Patent Literature 1: Japanese Unexamined Patent Publication No. 2000-339731
Patent Literature 2: Japanese Unexamined Patent Publication No. H09-115146
Patent Literature 3: Japanese Unexamined Patent Publication No. H10-143873
Patent Literature 4: Japanese Unexamined Patent Publication No. H11-191222
Patent Literature 5: Japanese Unexamined Patent Publication No. H11-316954

SUMMARY OF THE INVENTION

An object of the present invention is to provide an optical disc device capable of performing a stable interlayer jump in a multilayer optical recording medium in which coma aberrations largely differ due to base material thicknesses of respective recording layers even if the inclination of the multilayer optical recording medium is the same.

One aspect of the present invention is directed to an optical disc device for recording or reproducing information on or from a multilayer optical recording medium including a first recording layer and a second recording layer, comprising an optical head including a light source, a condensing optical system including an objective lens for receiving a light beam emitted from the light source and forming a microspot on the multilayer optical recording medium, a photodetector for receiving the light beam reflected by the multilayer optical recording medium and outputting an electrical signal corresponding to the amount of light and a coma aberration correcting portion for correcting a coma aberration of the condensing optical system; and a controller for controlling the condensing optical system and the coma aberration correcting portion, wherein the controller controls the condensing optical system and the coma aberration correcting portion so that the correction of the coma aberration from a value suitable for the first recording layer to a value specified for the second recording layer is started before a movement of a focus position of the microspot from the first recording layer to the second recording layer is completed.

By the above construction, an optical disc device can be realized which can make a coma aberration in a recording layer as a destination of a movement of a focus position satisfactory, obtain a good focus error signal and perform a stable interlayer jump.

EMBODIMENTS OF THE INVENTION

Hereinafter, embodiments of the present invention are described with reference to the drawings.

First Embodiment

In a first embodiment, an example of an optical disc device according to the present invention is described.

Figure 1:
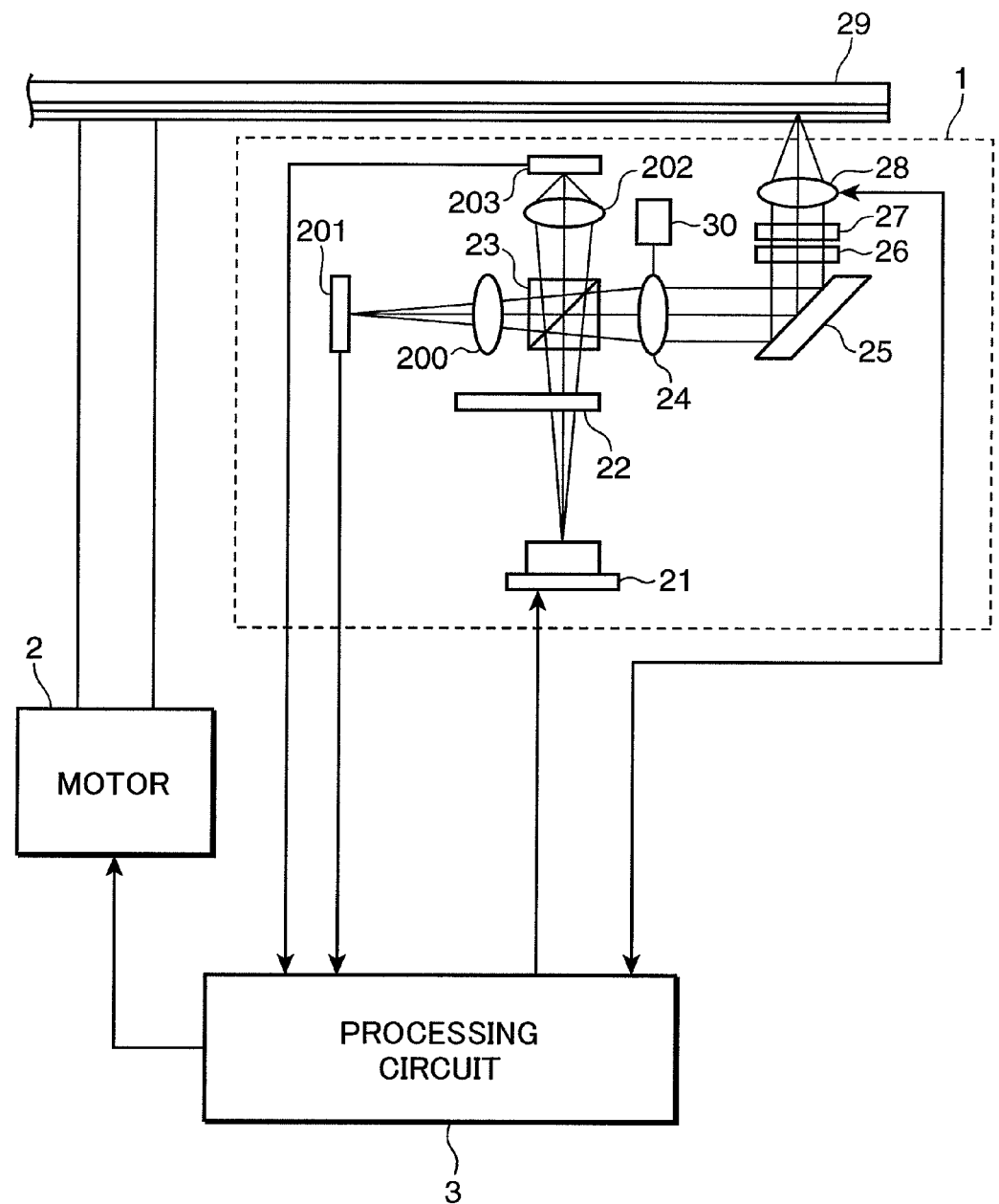
FIG. 1 is a diagram showing an example of an optical disc device according to a first embodiment of the invention.
Figure 2:
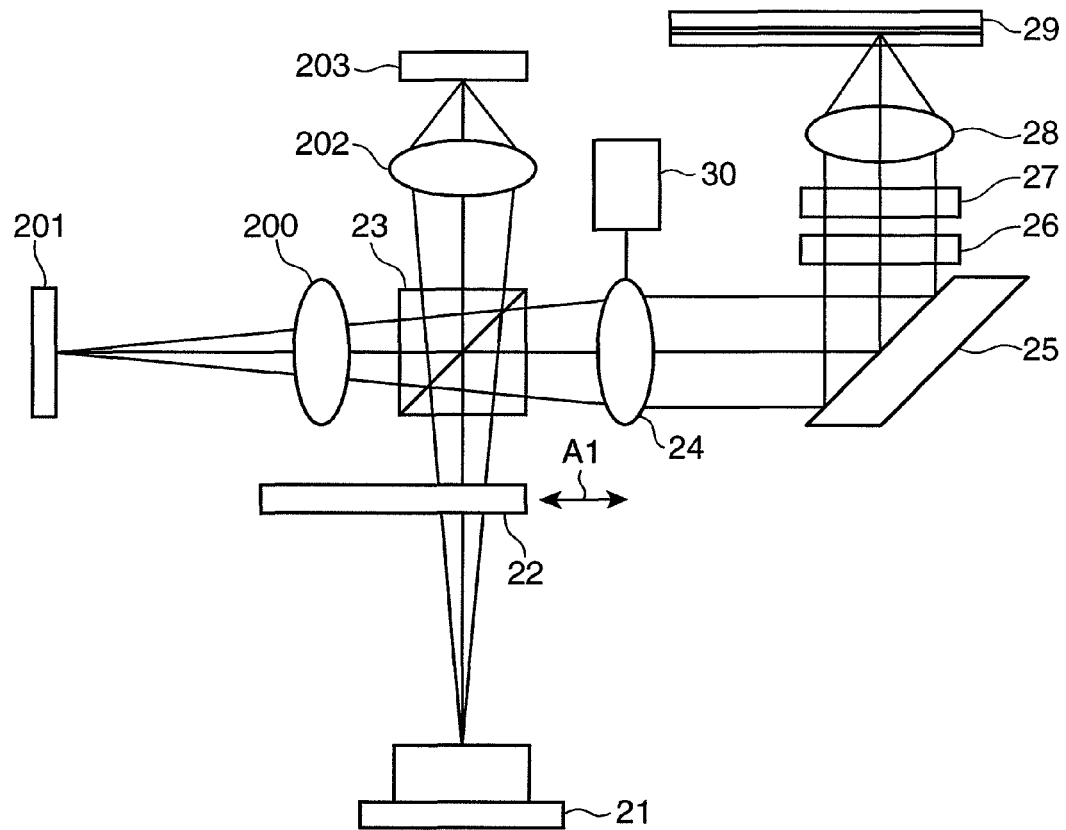
FIG. 2 is a diagram showing an example of an optical head incorporated in the optical disc device shown in FIG. 1.

FIG. 1 is a construction diagram of an optical disc device according to the first embodiment, and FIG. 2 is a diagram showing an example of an optical head incorporated in the optical disc device shown in FIG. 1. The optical disc device shown in FIG. 1 is provided with an optical head 1, a motor 2 and a processing circuit 3. As shown in FIG. 2, the optical head 1 includes a light source 21, a light quantity attenuation element 22, a polarization beam splitter 23, a collimator lens 24, a mirror 25, a coma aberration correcting element 26, a quarter wave plate 27, an objective lens 28, a one-axis actuator 30, a cylindrical lens 200, a photodetector 201, a condenser lens 202 and a light source light quantity controlling photodetector 203. An optical recording medium 29 is a multilayer optical recording medium including two, three or more recording layers. For example, a Blu-ray disc including two recording layers may be used as such. It is also possible to use a high-density optical recording medium including three, four or more recording layers constructed similar to a Blu-ray disc.

In this embodiment, the light source 21 constitutes an example of a light source; the light quantity attenuation element 22, the polarization beam splitter 23, the mirror 25, the coma aberration correcting element 26, the quarter wave plate 27 and the objective lens 28 constitutes an example of a condensing optical system including an objective lens for receiving a light beam emitted from the light source and forming a microspot on the optical recording medium 29; and the condensing optical system includes various actuators (not shown) such as a focus actuator and a tracking actuator for driving the objective lens 28 in a focusing direction and a tracking direction.

The photodetector 201 constitutes an example of a photodetector for receiving a light beam reflected by the multilayer optical recording medium and outputting an electrical signal corresponding to the amount of light. The coma aberration correcting element 26 constitutes an example of a coma aberration correcting portion for correcting a coma aberration of the condensing optical system. The collimator lens 24 and the one-axis actuator 30 (e.g. stepping motor) constitute an example of a spherical aberration correcting portion for correcting a spherical aberration of the condensing optical system by changing a degree of divergence of light in the condensing optical system.

The processing circuit 3 includes a CPU (central processing unit), memories (RAM, ROM), various detection circuits, various drive circuits, an A/D converter, a D/A converter, etc. and constitutes an example of a controller for controlling the condensing optical system and the come aberration correcting portion. The processing circuit 3 is partly or entirely constructed by an integrated circuit and constitutes examples of a first controller for controlling the condensing optical system and a second controller for controlling the coma aberration correcting portion. The processing circuit 3 may not only execute various controls to be described later, but also function as an Rf amplitude detector, a reproducing unit, a focus control circuit, a tracking control circuit and a tilt control circuit.

Here, the light source 21 is constructed, for example, by a GaN semiconductor laser element (wavelength of 390 to 450 nm) and outputs coherent light for recording or reproduction to a recording layer of the optical recording medium 29. A wavelength of the light source 21 is, for example, 405 nm. The light quantity attenuation element 22 is an optical element for reducing noise of the light source 21 and movable in a direction of arrow A1. For example, as disclosed in Japanese Unexamined Patent Publication No. 2000-195086, the light quantity attenuation element 22 includes a glass substrate and a film (e.g. Cr-film) for attenuating the light quantity is formed in a part of the glass substrate.

The polarization beam splitter 23 has, for example, a transmittance of 5% and a reflectance of 95% for certain linearly polarized light and has a transmittance of 100% for linearly polarized light orthogonal to the former linearly polarized light. The collimator lens 24 is a lens for converting divergent light emitted from the light source 21 into parallel light. The spherical aberration correcting portion is constructed by the collimator lens 24 and the one-axis actuator 30 and corrects a spherical aberration created when a base material thickness of the optical recording medium 29 differs from an optimal base material thickness. The above spherical aberration can be corrected by the one-axis actuator 30 changing the position of the collimator lens 24.

The mirror 25 is an optical element for reflecting incident light in a direction toward the optical recording medium 29 and has a property of reflecting 100% of the incident light. The coma aberration correcting element 26 is an optical element constructed by using a liquid crystal element, which is described in detail later, and capable of giving a coma aberration to the incident light. The quarter wave plate 27 is an optical element made of a birefringent material and adapted to convert linearly polarized light into circularly polarized light. The objective lens 28 is a lens for focusing light on the recording layer of the optical recording medium 29 and has a numerical aperture (NA) of 0.85. The numerical aperture of the objective lens 28 is not particularly limited to this example and a value equal to or larger than 0.83 and equal to or smaller than 0.86 may be used. The higher the numerical aperture (NA), the larger the coma aberration or the spherical aberration. Thus, the present invention can be suitably used when the numerical aperture (NA) of the objective lens is equal to or larger than 0.83, preferably equal to or larger than 0.85 and more preferably equal to or larger than 0.86. In the case of a solid immersion lens (SIL) as a focusing member, a higher numerical aperture is possible, e.g. an equivalent NA of the focusing member can be set to be larger than 1. Thus, the present invention can be more suitably used when a focusing member including a solid immersion lens having such a high numerical aperture is used.

The cylindrical lens 200 is such that an incident surface thereof is a cylindrical surface, an emergent surface thereof is a rotation-symmetrical surface with respect to a lens optical axis, and astigmatism for enabling the detection of a focus error signal by a so-called astigmatism method is given to incident light. The photodetector 201 is for receiving the light reflected by the recording layer of the optical recording medium 29 and converting it into an electrical signal. The condenser lens 202 is for condensing the light having passed through the polarization beam splitter 23 on the light source light quantity controlling photodetector 203. The light source light quantity controlling photodetector 203 is for receiving the light having passed through the polarization beam splitter 23, converting the received light into an electrical signal and outputting a signal used to detect the light quantity of the light source 21.

The operation of the thus constructed optical disc device is described. First of all, when the optical recording medium 29 is set in the optical disc device, the processing circuit 3 rotates the motor 2 by outputting a signal for rotating the motor 2. Subsequently, the processing circuit 3 drives the light source 21 to emit light. The light emitted from the light source 21 is reflected by the optical recording medium 29 and incident on the photodetector 201. The photodetector 201 outputs a focus error signal indicating an in-focus condition of the light on the optical recording medium 29 and a tracking error signal indicating an irradiated position of the light to the processing circuit 3.

Based on these signals, the processing circuit 3 outputs a signal for controlling the objective lens 28, whereby the light emitted from the light source 21 is focused on a desired track of the optical recording medium 29. Further, the processing circuit 3 reproduces information recorded on the optical recording medium 29 based on the signals output from the photodetector 201. The signal output from the light source light quantity controlling photodetector 203 is input to the processing circuit 3, which controls the light source 21 so that this signal has a desired value, whereby the light quantity of the light emerging from the objective lens 28 has a desired value.

Next, the operation of the optical head 1 is described in detail. Linearly polarized light emitted from the light source 21 passes through the light quantity attenuation element 22, is mostly reflected by the polarization beam splitter 23 while partly passing therethrough. This reflected light is incident on the collimator lens 24 and converted into any one of divergent light, parallel light and convergent light depending on the position of the collimator lens 24. The light whose degree of convergence was converted is incident on the mirror 25 to be reflected 100%, whereby a propagation direction thereof is changed to a direction toward the optical recording medium 29.

This reflected light passes through the coma aberration correcting element 26, which in turn gives such a coma aberration as to correct a coma aberration created when the optical recording medium 29 is inclined to the incident light. The light having passed through the coma aberration correcting element 26 is incident on the quarter wave plate 27, whereby the linearly polarized light is converted into circularly polarized light. This circularly polarized light is incident on the objective lens 28 to create a spherical aberration depending on the degree of divergence or convergence of the incident light, and is focused on the optical recording medium 29.

Here, the light including a wavefront aberration created when the optical recording medium 29 deviates from an optimal base material thickness and wavefront aberrations for correcting wavefront aberrations created in the respective recording layers of the optical recording medium 29 is focused by the objective lens 28. Further, such a coma aberration as to correct a coma aberration created when the optical recording medium 29 is inclined is given by the coma aberration correcting element 26 to the light focused by the objective lens 28. As a result, a light spot free from aberrations, i.e. a light spot narrowed up to a diffraction limit is formed on each recording layer of the optical recording medium 29 even if the base material thickness of the optical recording medium 29 deviates or even if the optical recording medium 29 is inclined.

Subsequently, the circularly polarized light reflected by the optical recording medium 29 passes through the objective lens 28 and is incident on the quarter wave plate 27 to be converted into linearly polarized light in a direction orthogonal to the linearly polarized light emitted from the light source 21. The linearly polarized light converted by the quarter wave plate 27 passes through the coma aberration correcting element 26 and is totally reflected by the mirror 25. The reflected light passes through the collimator lens 24 and totally passes through the polarization beam splitter 23, wherefore it does not return to the light source 21. Further, astigmatism is given to the light having passed through the polarization beam splitter 23 by the cylindrical lens 200, and the light having passed through this cylindrical lens 200 is focused on the photodetector 201.

The photodetector 201 outputs a focus error signal indicating an in-focus condition of the light on the optical recording medium 29 and a tracking error signal indicating the irradiated position of the light to the processing circuit 3. Here, the focus error signal and the tracking error signal are detected by known technologies, e.g. an astigmatism method and a push-pull method.

The unillustrated focus control circuit in the processing circuit 3 controls the position of the objective lens 28 in an optical axis direction of the objective lens 28 based on the focus error signal so that the light is constantly focused on the optical recording medium. Further, the unillustrated tracking control circuit in the processing circuit 3 controls the position of the objective lens 28 based on the tracking error signal so that the light is focused on a desired track of the optical recording medium 29. Information recorded on the optical recording medium 29 is also obtained from the photodetector 201. The light having passed through the polarization beam splitter 23 is condensed by the condenser lens 202 on the light source light quantity controlling photodetector 203, which outputs an electrical signal corresponding to the amount of the light emitted from the light source 21.

Figure 3:
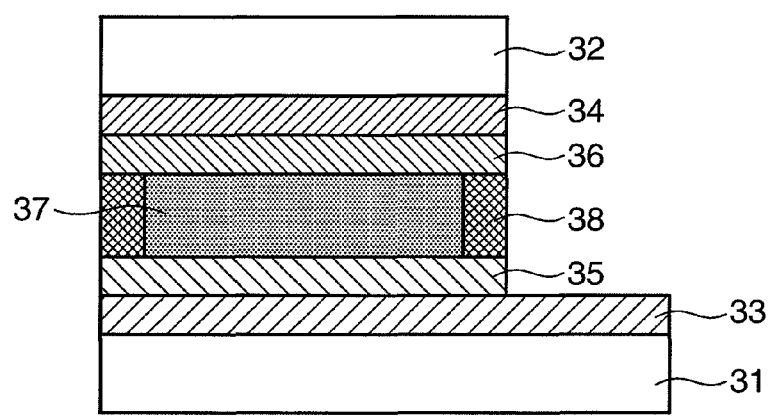
FIG. 3 is a section showing an example of a coma aberration correcting element shown in FIG. 2.
Figure 4:
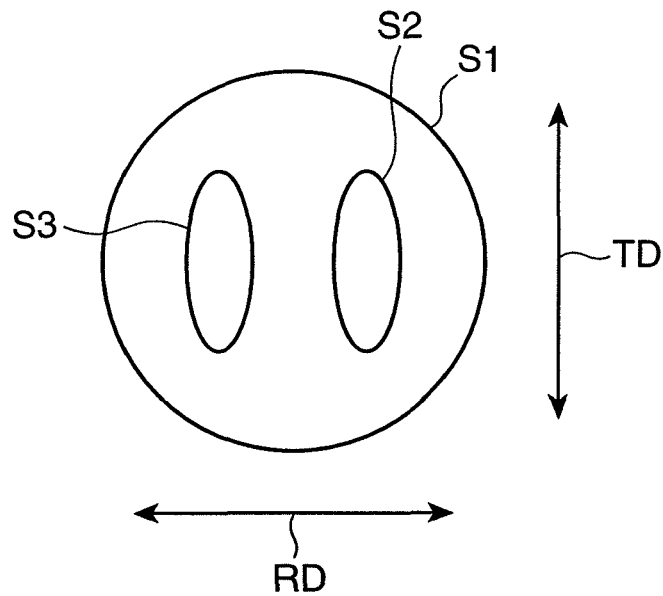
FIG. 4 is a diagram showing an exemplary pattern of radial transparent electrodes of the coma aberration correcting element shown in FIG. 2.
Figure 5:
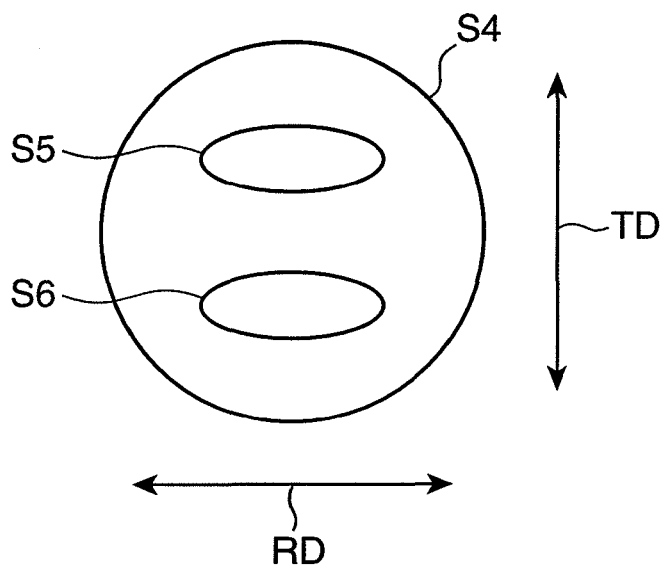
FIG. 5 is a diagram showing an exemplary pattern of tangential transparent electrodes of the coma aberration correcting element shown in FIG. 2.

Here, the coma aberration correcting element 26 is described in detail. An optical element capable of correcting a coma aberration orthogonal to radial and tangential directions can be used as the coma aberration correcting element 26. For example, an optical element disclosed in Japanese Unexamined Patent Publication No. H11-110802 can be used as the coma aberration correcting element 26. FIG. 3 is a section showing an example of the coma aberration correcting element 26 and FIGS. 4 and 5 are diagrams showing exemplary electrode patterns used in the coma aberration correcting element 26.

In FIG. 3, the coma aberration correcting element 26 includes a first substrate 31, a second substrate 32 arranged substantially in parallel with the first substrate 31, a first voltage application electrode 33 arranged on the first substrate 31, a second voltage application electrode 34 arranged substantially in parallel with the first voltage application electrode so as to face the first voltage application electrode 33, a translucent resin film 35 formed to cover the first voltage application electrode 33, a translucent resin film 36 formed to cover the second voltage application electrode 34, a liquid crystal 37 arranged between the translucent resin films 35 and 36 (between the first and second voltage application electrodes 33 and 34), and a sealing resin 38 arranged between the translucent resin films 35 and 36 to surround the liquid crystal 37.

Here, the first and second substrates 31, 32 are, for example, made of glass and translucent. The first voltage application electrode 33 is an electrode for applying a necessary voltage to the liquid crystal 37. The first voltage application electrode 33 is formed on an inner (toward the liquid crystal 37) principal surface of the first substrate 31. The second voltage application electrode 34 is an electrode for applying a necessary voltage to the liquid crystal 37 and applies a necessary voltage synthesized using the first and second voltage application electrodes to the liquid crystal together with the first voltage application electrode 33. The second voltage application electrode 34 is formed on an inner (toward the liquid crystal 37) principal surface of the second substrate 32. The first and second voltage application electrodes 33, 34 are translucent, made of, e.g. ITO (Indium Tin Oxide) and formed with patterns to respectively give the necessary voltages.

The translucent resin films 35, 36 are oriented films for orienting the liquid crystal 37 in a specified direction and made of, e.g. polyvinyl alcohol films. The liquid crystal 37 can be oriented in the specified direction by rubbing the translucent resin film 35 or 36. The liquid crystal 37 functions as a phase change layer for changing the phase of the incident light. The liquid crystal 37 is made of, e.g. nematic liquid crystal. A refractive index of the liquid crystal 37 can be changed by changing a voltage difference between the first and second voltage application electrodes 33 and 34, whereby the phase of the incident light can be changed. Further, the sealing resin 38 is for sealing the liquid crystal 37 and is made of, e.g. epoxy resin.

One of the first and second voltage application electrodes 33, 34 is composed of segment electrodes S1 to S3 as shown in FIG. 4, the other is composed of segment electrodes S4 to S6 as shown in FIG. 5. In FIGS. 4 and 5, an arrow TD indicates a tangential direction, an arrow RD indicates a radial direction, a pattern shown in FIG. 4 is a pattern of radial transparent electrodes and a pattern shown in FIG. 5 is a pattern of tangential transparent electrodes.

The operation of the thus constructed coma aberration correcting element 26 is described. Control voltages are respectively applied to the first and second voltage application electrodes 33, 34 and the segment electrodes S1 to S6 of the coma aberration correcting element 26 from the outside, thereby giving a phase corresponding to the shown patterns to the light incident on the coma aberration correcting element 26. The patterns shown in FIGS. 4 and 5 can give the wavefronts of coma aberrations in the radial and tangential directions to the incident light.

Next is described an interlayer jump operation from one recording layer to another recording layer of a multilayer optical recording medium from or on which information is recorded or reproduced. As described above, in the case of an objective lens having a high NA, created coma aberrations largely change if the base material thicknesses differ even when the inclination of the multilayer optical recording medium is the same. As the NA of the objective lens increases, a coma aberration is created due to a fabrication error of the objective lens. Other optical elements used in an optical head also have coma aberrations, and all these coma aberrations become a coma aberration of the optical head.

Since this coma aberration deteriorates a recording/reproducing performance, the objective lens is normally inclined with respect to its optical axis to create a coma aberration and the coma aberrations of the optical elements constituting the optical head are canceled using this coma aberration, thereby making such an adjustment that the optical head itself does not have any coma aberration.

However, in the case of an optical head including a spherical aberration correcting portion for changing the degree of divergence of light, the spherical aberration correcting portion is so driven that convergent light is incident on a recording layer with a thin base material and divergent light is incident on a recording layer with a thick base material in order to deal with the respective recording layers of a multilayer optical recording medium (since the base material thicknesses differ among the respective recording layers). At this time, if the objective lens is inclined, a coma aberration is created even if the multilayer optical recording medium is not inclined, and more coma aberration is created as the degree of divergence or convergence increases.

In this way, as the influence of the base material thicknesses of the respective recording layers of the multilayer optical recording medium increases, the amounts of coma aberration largely differ at the respective base material thicknesses even if the inclination of the multilayer optical recording medium is the same. In such a case, if such a coma aberration as to correct a coma aberration immediately before an interlayer jump is created at the time of an interlayer jump operation from a certain recording layer to another recording layer, a large coma aberration is created in the recording layer as a destination of the interlayer jump to affect the focus error signal. Thus, a stable interlayer jump operation cannot be performed if the coma aberration correction amount immediately before the interlayer jump is maintained.

Accordingly, in this embodiment, when an interlayer jump command is issued from the processing circuit 3, the objective lens 28 is moved after a coma aberration correction amount optimal for the recording layer as a starting point of the interlayer jump is changed to the one optimal for the recording layer as a destination of the interlayer jump before the interlayer jump. As a result, a good focus error signal can be obtained and a stable interlayer jump operation can be performed. Here, coma aberration correction amounts optimal for the respective recording layers can be obtained, for example, by learning the amount of inclination of the optical recording medium 29 before recording or reproduction and storing coma aberration correction amounts necessary for the obtained amount of inclination in a memory of the processing circuit 3 or the like.

Next, a procedure of a focus position moving operation, a spherical aberration correcting operation and a coma aberration correcting operation at the time of an interlayer jump operation according to the first embodiment of the present invention is described with reference to a flow chart shown in FIG. 6.

Figure 6:
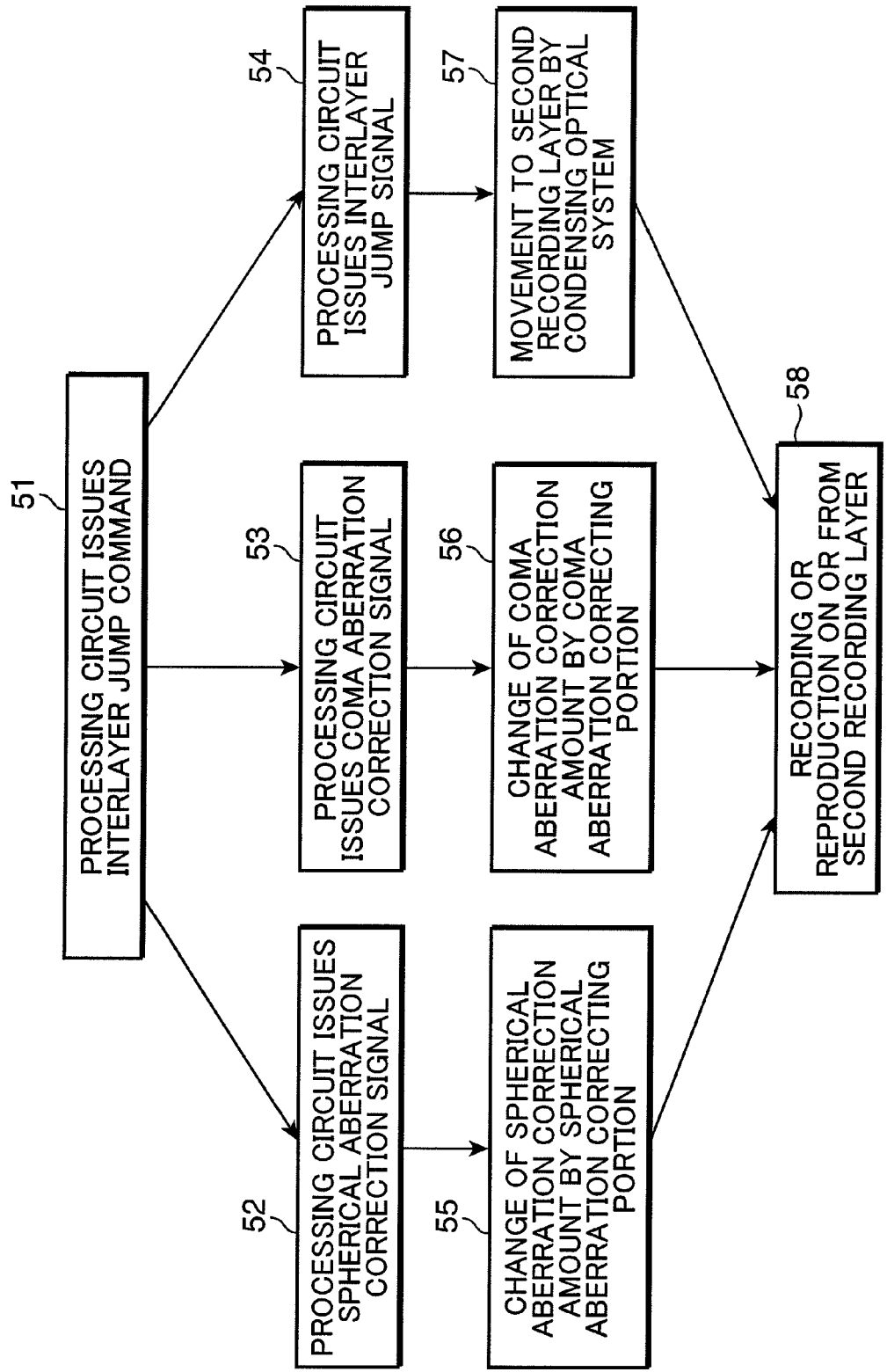
FIG. 6 is a flow chart showing an exemplary procedure of a focus position moving operation, a spherical aberration correcting operation and a coma aberration correcting operation at the time of an interlayer jump operation of the optical disc device shown in FIG. 1.

In FIG. 6, if the processing circuit 3 issues an interlayer jump command (or if the processing circuit 3 receives an interlayer jump command from an unillustrated other circuit) when a recording/reproducing operation is being performed while a focus control is executed for a first recording layer of the optical recording medium 29 (Step 51), the processing circuit 3 substantially simultaneously issues a spherical aberration correction signal, a coma aberration correction signal and an interlayer jump signal (Steps 52, 53 and 54). The processing circuit 3 changes a spherical aberration correction amount in the spherical aberration correcting portion from a value suitable for the first recording layer to a specified value in consideration of a correction amount suitable for a second recording layer as a destination of the jump, and changes a coma aberration correction amount in the coma aberration correcting portion from a value suitable for the first recording layer to a specified value in consideration of a correction amount suitable for the second recording layer as the destination of the jump (Steps 55, 56). Simultaneously with this, the processing circuit 3 controls the condensing optical system to move the focus position from the first recording layer to the second recording layer (Step 57). Thereafter, the processing circuit 3 executes a focus control for the second recording layer using the condensing optical system to record or reproduce information (Step 58).

Figure 7:
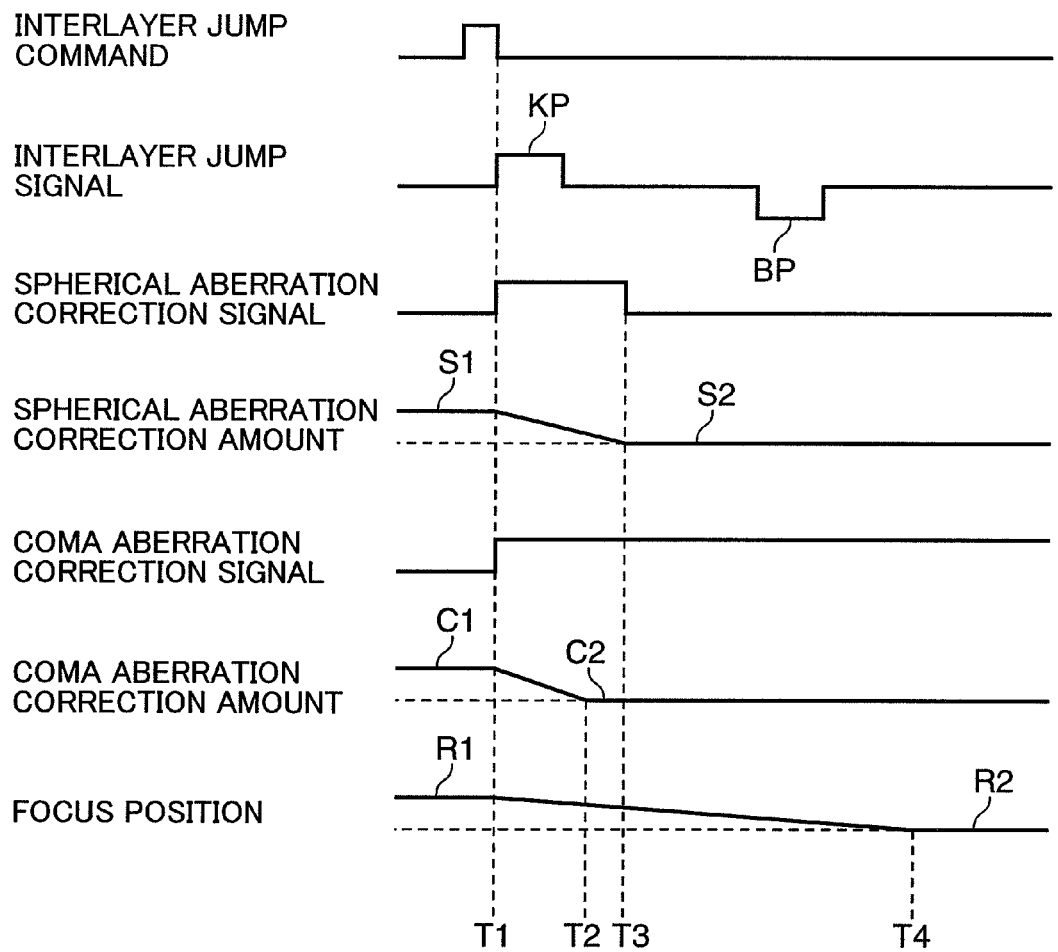
FIG. 7 is a timing chart showing exemplary changes of various signals at the time of the interlayer jump operation of the optical disc device shown in FIG. 1.

FIG. 7 is a timing chart showing exemplary changes of various signals in the interlayer jump operation. In FIG. 7, a horizontal axis represents time and a vertical axis represents voltages of the various signals, respectively. When the interlayer jump command in the above Step 51 is issued while the focus control is executed for the first recording layer, the interlayer jump signal (above Step 54), the spherical aberration correction signal (above Step 52) and the coma aberration correction signal (above Step 53) are issued using a signal corresponding to the command as a trigger (time T1).

The interlayer jump signal is composed of a kick pulse KP for starting a movement of the objective lens 28 to move the focus position from a position R1 of the first recording layer to a position R2 of the second recording layer by exiting from a focus control loop for the first recording layer on or from which information has been recorded or reproduced thus far, and a brake pulse BP for ending the movement of the objective lens 28 to proceed to a focus control loop for the second recording layer.

The spherical aberration correction signal shown in FIG. 7 is a signal waveform in the case of moving the collimator lens 24 shown in FIG. 2 by a drive method using a screw feed mechanism or the like. Using the signal corresponding to the interlayer jump command as a trigger (time T1), the above spherical aberration correction signal is output, a voltage (spherical aberration correction signal) for changing the position of the collimator lens 24 is applied to the spherical aberration correcting portion (one-axis actuator) until the spherical aberration correction amount becomes a spherical aberration correction amount S2 suitable for the second recording layer from a spherical aberration correction amount S1 suitable for the first recording layer (time T3), and the spherical aberration correction signal is no longer applied when the collimator lens 24 reaches a specified position.

The coma aberration correction signal shown in FIG. 7 is a signal output to enable the coma aberration correcting portion (coma aberration correcting element 26) shown in FIG. 2 to create a necessary coma aberration. Using the signal corresponding to the interlayer jump command as a trigger (time T1), the above coma aberration correction signal is output, a voltage (coma aberration correction signal) is applied to the coma aberration correcting portion (coma aberration correcting element 26) until the coma aberration correction amount becomes a coma aberration correction amount C2 suitable for the second recording layer from a coma aberration correction amount C1 suitable for the first recording layer. Even after the coma aberration reaches a specified value, the coma aberration correction signal is maintained to maintain this.

Figure 20:
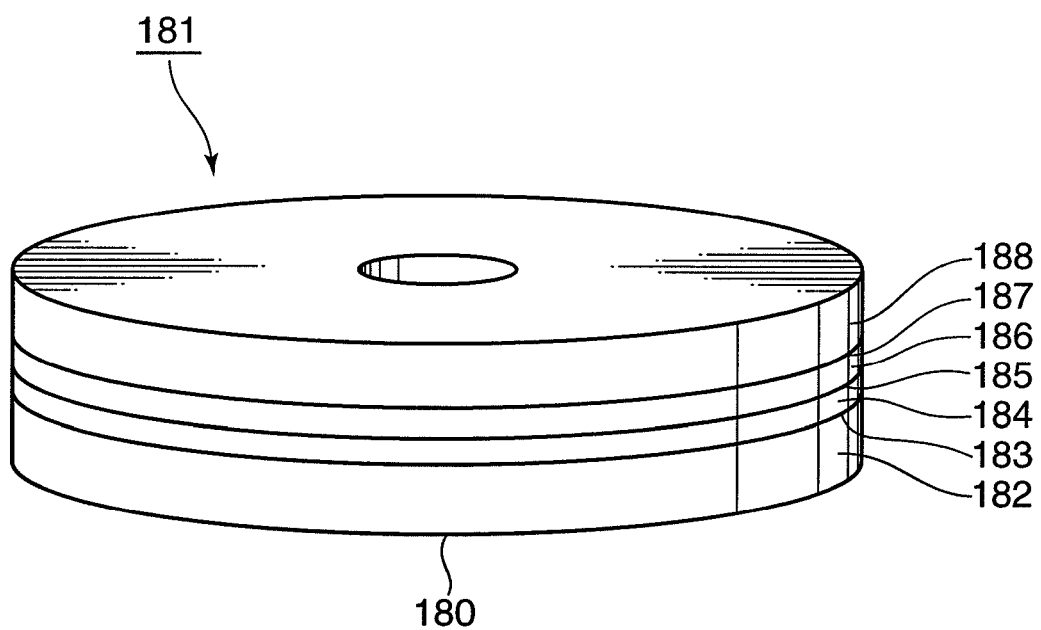
FIG. 20 is a construction diagram showing an exemplary construction of a multilayer optical recording medium.

Here, aberration correction amounts are described. The three-layer optical recording medium shown in FIG. 20 (base material thicknesses are 100 μm, 75 μm and 50 μm) is thought as a multilayer optical recording medium. When a wavelength is 405 nm and the NA of the objective lens is 0.85, a spherical aberration changes by 250 mλ if the base material thickness changes from 100 λm to 75 μm while changing by 500 mλ if the base material thickness changes from 100 μm to 50 μm.

At this time, in the case of a spherical aberration correcting portion using a collimator lens of about f16, a spherical aberration correction of about 12 mλ, can be performed if the collimator lens is moved by 100 μm in an optical axis direction. Thus, the collimator lens needs to be moved by about 2 mm if the base material thickness changes from 100 μm to 75 μm and needs to be moved by about 4 mm if the base material thickness changes from 100 μM to 50 μm. In order to enable such a large movement of the collimator lens, several 100 milliseconds are necessary in the case of moving the collimator lens by a screw feed mechanism using a stepping motor.

On the contrary, if the inclination of the multilayer optical recording medium is 1°, coma aberrations created in the recording layers whose base material thicknesses are 100 μm, 75 μm and 50 μm are respectively 100 mλ, 75 mλ and 50 mλ. The coma aberration changes by 25 mλ if the base material thickness changes from 100 μm to 75 μm and changes by 50 mλ if the base material thickness changes from 100 μm to 50 μm. In the case of correcting such a coma aberration change by a coma aberration correcting element using a liquid crystal, several 10 milliseconds are necessary in connection with a response speed of the liquid crystal. Thus, the coma aberration correction amount reaches the specified value earlier than the spherical aberration correction amount.

In this embodiment, before the movement of the focus position of the microspot from the first recording layer to the second recording layer is completed, i.e. before the interlayer jump is completed (e.g. time T4 of FIG. 7), it is started to change the spherical aberration correction amount and the coma aberration correction amount (e.g. time T1 of FIG. 7). Thus, upon executing the focus control for the second recording layer, the spherical aberration correction and the coma aberration correction suitable for the second recording layer have been already made, wherefore there are effects that the focus control can be stably executed and the deviation of the focus control due to a failure of the interlayer jump can be prevented.

Further, an effect of being able to perform the interlayer jump within a short period of time can be obtained by starting the movement of the focus position from the first recording layer to the second recording layer almost at the same time (at the same time or substantially at the same time) as it is started to change the spherical aberration correction amount and the coma aberration correction amount like the respective operations at time T1 shown in FIG. 7.

There is a further effect that the focus control can be more stably executed by completing the change of the spherical aberration correction amount and the change of the coma aberration correction amount (times T2, T3 of FIG. 7) before the movement of the focus position to the second recording layer is completed (e.g. before time T4 of FIG. 7), i.e. during the movement of the focus position of the microspot as shown in FIG. 7.

Figure 8:
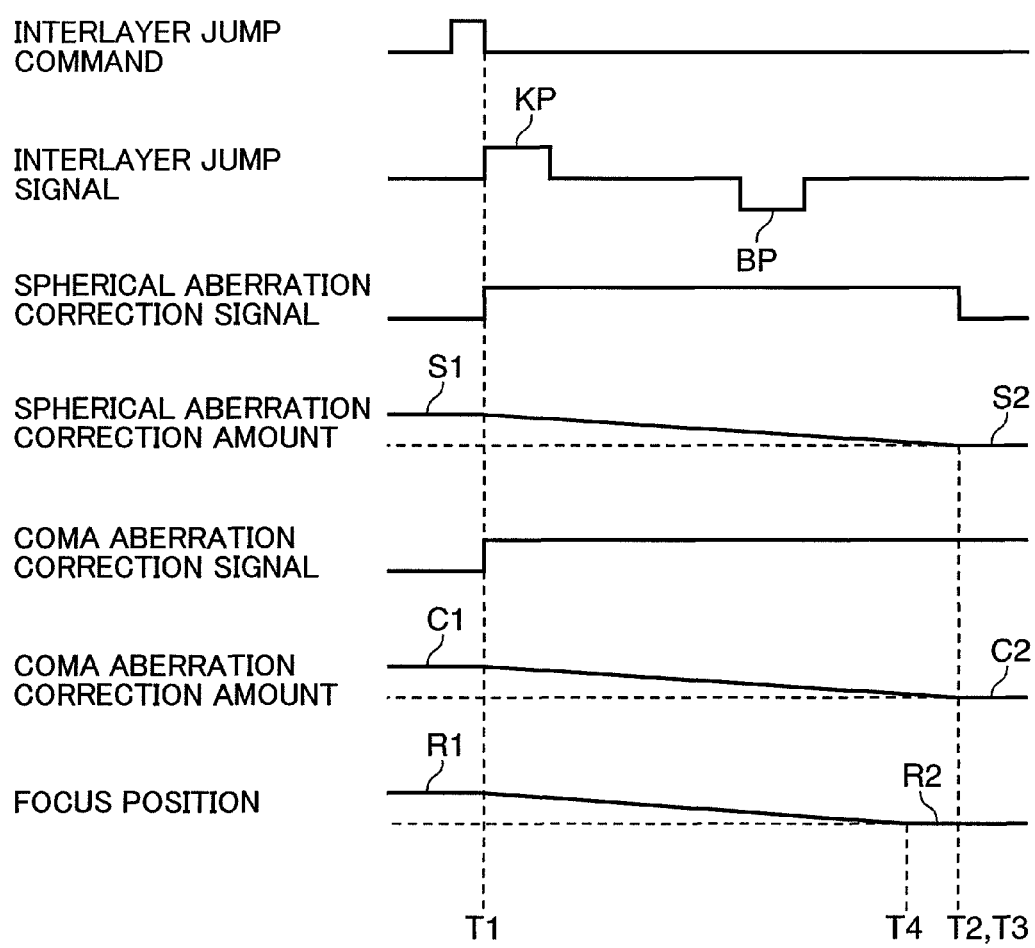
FIG. 8 is a timing chart showing other exemplary changes of various signals at the time of the interlayer jump operation of the optical disc device shown in FIG. 1.

However, if it takes time to change the spherical aberration correction amount and the coma aberration correction amount, the movement of the focus position to the second recording layer may be completed (e.g. time T4 of FIG. 8) before the change of the spherical aberration correction amount and the change of the coma aberration correction amount are completed (before times T2, T3 of FIG. 8) as shown in FIG. 8, whereby an effect of being able to more shorten the time required for the interlayer jump can be obtained. Further, the movement of the focus position of the microspot and the coma aberration correction and/or the spherical aberration correction may be substantially simultaneously completed. In this case, the time required for the interlayer jump can be more shortened.

Next, a relationship with the number of the recording layers of the multilayer optical recording medium is described. In the case of considering a three-layer optical recording medium as described above, a coma aberration changes only by 25 mλ if the base material thickness changes from 100 μm to 75 μm when the multilayer optical recording medium is inclined by 1° with respect to an optical head. This 25 mλ is large since it is equivalent to 40% of a martial criterion (70 mλ). However, there is a possibility of processing this within the margin of the optical head.

However, the effects of the present invention are particularly effective in the case of an interlayer jump from the recording layer corresponding to the base material thickness of 100 μm to the recording layer corresponding to the base material thickness of 50 μm, i.e. in the case of an interlayer jump over one recording layer. In other words, in the case of an interlayer jump over the recording layer without changing the coma aberration correction amount, the amount of coma aberration is smaller in the recording layer closer to the initial recording layer (coma aberration of 25 λm is created in the recording layer having a base material thickness of 75 μm and coma aberration of 50 mλ is created in the recording layer having the base material thickness of 50 μm if the coma aberration correction amount of the base material thickness of 100 μm is maintained). Thus, a focus error signal of the recording layer having the base material thickness of 75 μm is better than a focus error signal of the recording layer having the base material thickness of 50 μm.

Thus, if focus is locked in after the focus position is moved, there occurs such a malfunction of performing an interlayer jump to the recording layer having the base material thickness of 75 μm instead of a supposed-to-be interlayer jump to the recording layer having the base material thickness of 50 μm over one recording layer. In this way, it is particularly effective to change the coma aberration correction amount before the movement of the focus position in the case of an interlayer jump over the recording layer. Although a case of jumping over one recording layer in the three-layer optical recording medium is considered in this embodiment, it goes without saying that the present invention is particularly effective in the case of jumping over one or more recording layers in a multilayer optical recording medium including four or more recording layers.

Next, the spherical aberration correction amount and the coma aberration correction amount are described. In the case of considering a three-layer optical recording medium as described above, the spherical aberration correction amount can be determined based on standard values of the thicknesses of first and second intermediate layers. Upon inserting the optical recording medium into the optical disc device or upon turning the optical disc device on, the processing circuit 3 may learn and obtain a spherical aberration correction amount best for an information signal for each recording layer by executing a focus control to each recording layer and may assume a difference between the obtained spherical aberration correction amounts for the respective recording layers as a change amount of the spherical aberration correction amount, i.e. a difference between a spherical aberration correction amount suitable for the first recording layer and that suitable for the second recording layer.

Preferably, change amounts of the spherical aberration correction amount are tentatively determined based on the standard thicknesses of the intermediate layers, e.g. standard thicknesses of the intermediate layers specified in the specification of a Blu-ray disc if the optical recording medium 29 is a Blu-ray disc. Upon inserting the optical recording medium into the optical disc device or upon turning the optical disc device on, the processing circuit 3 can learn a spherical aberration correction amount best for an information signal for each recording layer by executing a focus control to each recording layer and correct the tentatively determined change amounts of the spherical aberration correction amounts based on differences between the obtained spherical aberration correction amounts for the respective recording layers.

For the coma aberration correction amount, the processing circuit 3 learns the inclination of the optical recording medium upon inserting the optical recording medium into the optical disc device or upon turning the optical disc device on. Further, coma aberration correction amounts optimal for the inclination of the optical recording medium are stored beforehand in the optical disc device, e.g. in the processing circuit 3. By doing so, the processing circuit 3 calls the stored coma aberration correction amount and uses this value based on the learned value of the inclination of the optical recording medium. Another method may be such that the processing circuit 3 learns and obtains a coma aberration correction amount best for an information signal for each recording layer by executing a focus control to each recording layer and assumes a difference between the obtained coma aberration correction amounts for the respective recording layers as change amount of the coma aberration correction amount, i.e. a difference between the coma aberration correction amount suitable for the first recording layer and that suitable for the second recording layer.

As described above, in this embodiment, the focus error signal in the recording layer as the destination of the movement of the focus position becomes satisfactory and a stable interlayer jump can be performed by starting a correction to change the spherical aberration and the coma aberration optimal for the recording layer as the starting point of the interlayer jump to those optimal for the recording layer as the destination of the interlayer jump before the movement of the focus position is completed during the interlayer jump of the multilayer optical recording medium.

Second Embodiment

Next, an example of an optical disc device according to a second embodiment of the present invention is described with reference to the drawings. This embodiment differs from the above first embodiment only in the timing of the interlayer jump and is similar to the first embodiment in other points. Accordingly, it is assumed in this embodiment that what is not particularly described is the same as in the first embodiment, the constituent members identified by the same reference numerals as in the first embodiment have the same functions as the constituent members of the first embodiment shown in FIGS. 1 and 2 unless being particularly described, and the construction of the optical disc device according to the second embodiment is described with reference to FIGS. 1 and 2 without being shown anew.

Figure 9:
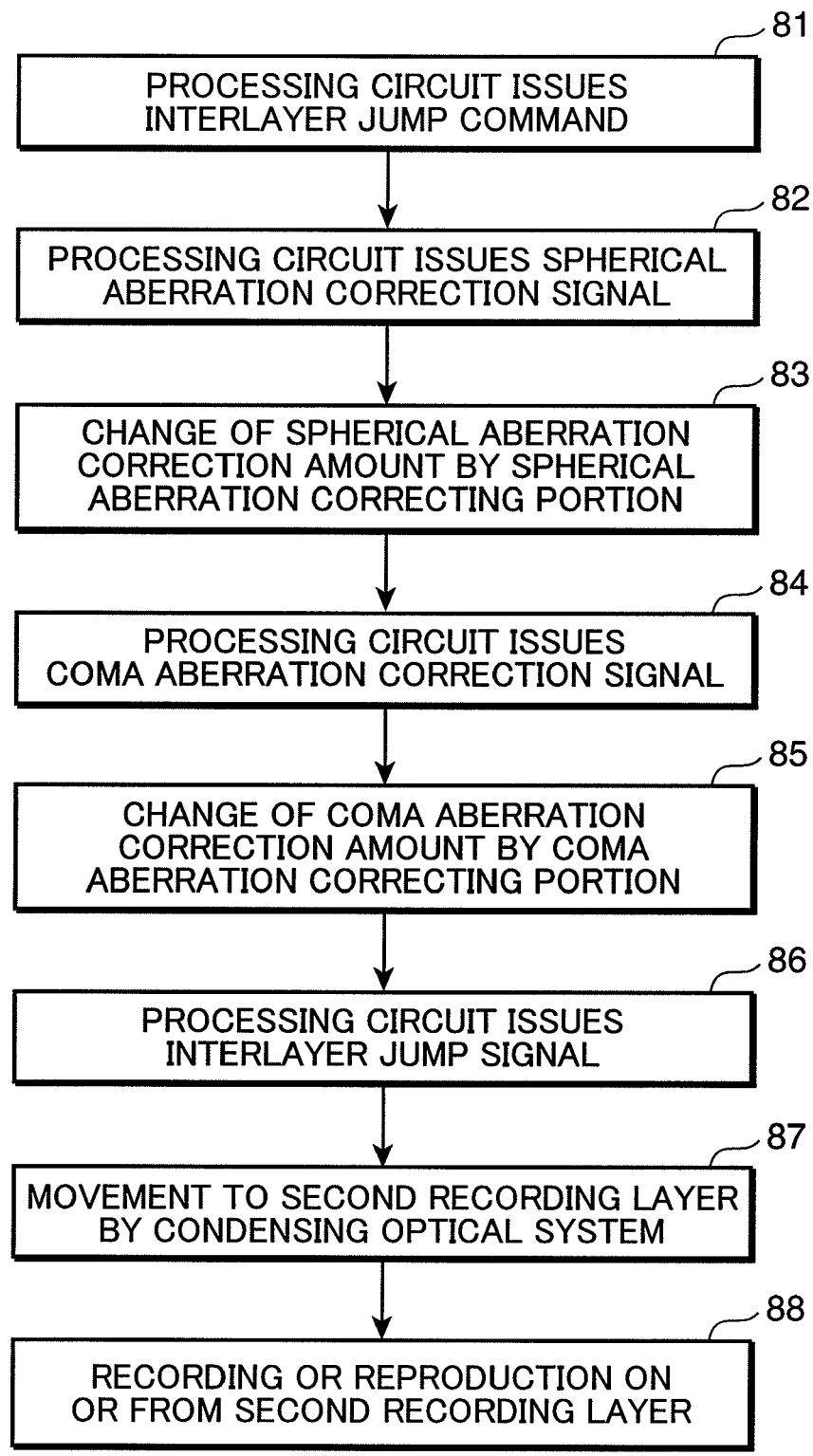
FIG. 9 is a flow chart showing an exemplary procedure of a focus position moving operation, a spherical aberration correcting operation and a coma aberration correcting operation at the time of an interlayer jump operation of an optical disc device according to a second embodiment of the invention.

FIG. 9 is a flow chart showing a procedure of a focus position movement, a spherical aberration correcting operation and a coma aberration correcting operation at the time of an interlayer jump operation in the optical disc device according to the second embodiment of the invention. In FIG. 9, if a processing circuit 3 issues an interlayer jump command (or if processing circuit 3 receives an interlayer jump from an unillustrated other circuit) when a recording/reproducing operation is being performed while a focus control is executed for a first recording layer (Step 81), the processing circuit 3 first issues a spherical aberration correction signal (Step 82) and changes a spherical aberration correction amount in a spherical aberration correcting portion from a value suitable for the first recording layer to a specified value in consideration of a correction amount suitable for a second recording layer as a destination of the jump (Step 83).

Thereafter, the processing circuit 3 issues a coma aberration correction signal (Step 84) and changes a coma aberration correction amount in a coma aberration correcting portion from a value suitable for the first recording layer to a specified value in consideration of a correction amount suitable for the second recording layer as the destination of the jump (Step 85).

Thereafter, the processing circuit 3 issues an interlayer jump signal (Step 86) and controls a condensing optical system to move a focus position from the first recording layer to the second recording layer (Step 87). Thereafter, the processing circuit 3 executes a focus control for the second recording layer using the condensing optical system to record or reproduce information (Step 88).

As described above, in this embodiment, the spherical aberration correction amount is first changed and then the coma aberration correction amount is changed prior to the movement of the focus position, and the spherical aberration correction and the coma aberration correction suitable for the second recording layer are almost completed when the focus control is executed for the second recording layer. As a result, there are effects that a stable focus control can be executed for the second recording layer without being adversely affected by the spherical aberration and the deviation of the focus control due to an interlayer jump failure can be prevented.

Figure 10:
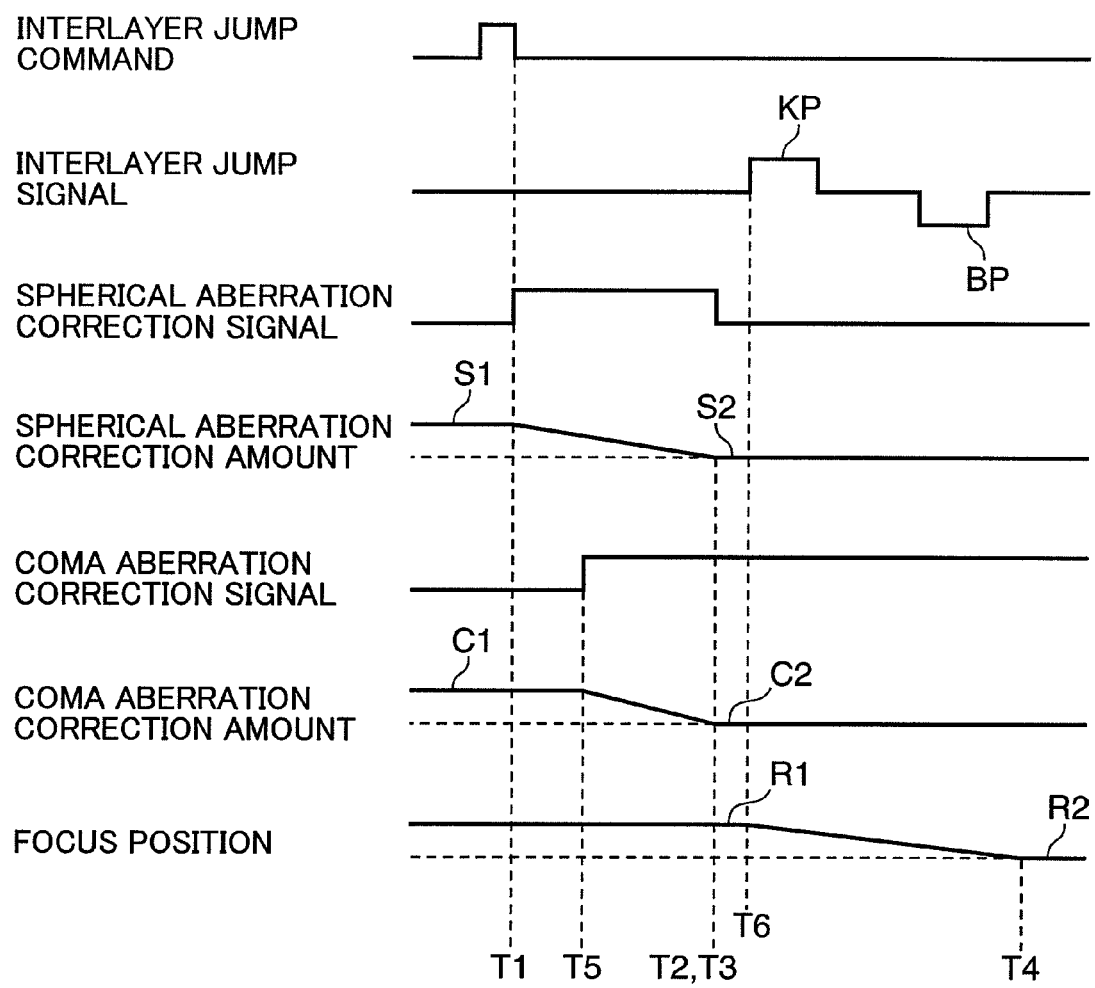
FIG. 10 is a timing chart showing exemplary changes of various signals at the time of the interlayer jump operation of the optical disc device according to the second embodiment of the invention.

FIG. 10 is a timing chart showing exemplary changes of various signals in the above interlayer jump operation. In FIG. 10, a horizontal axis represents time and a vertical axis represents voltages of the various signals, respectively. When the interlayer jump command in the above Step 81 is issued while the focus control is executed for the first recording layer, a spherical aberration correction signal first changes using a signal corresponding to the command as a trigger (time T1) (above Step 82).

The spherical aberration correction signal shown in FIG. 10 is a signal waveform in the case of moving the collimator lens 24 shown in FIG. 2 by a drive method using a screw feed mechanism or the like. Using the signal corresponding to the interlayer jump command as a trigger (time T1), the above spherical aberration correction signal changes and a voltage (spherical aberration correction signal) for changing the position of the collimator lens 24 is applied to the spherical aberration correcting portion (one-axis actuator) until the spherical aberration correction amount changes from a spherical aberration correction amount S1 suitable for the first recording layer to a specified correction amount, i.e. a spherical aberration correction amount S2 suitable for the second recording layer.

Thereafter (time T5), the processing circuit 3 changes a coma aberration correction signal (above Step 84). As a result, a voltage (coma aberration correction signal) is so applied to the coma aberration correcting portion (coma aberration correcting element 26) that the coma aberration correction amount changes from a coma aberration correction amount C1 suitable for the first recording layer to a coma aberration correction amount C2 suitable for the second recording layer. Even after the coma aberration reaches a specified value, the coma aberration correction signal is maintained to maintain this.

Subsequently, the spherical aberration correction and the coma aberration correction suitable for the second recording layer are completed (times T2, T3) and, thereafter (time T6), the interlayer jump signal changes (above Step 86). The interlayer jump signal is composed of a kick pulse KP for starting a movement of an objective lens to move the focus position to the second recording layer by exiting from a focus control loop for the first recording layer on or from which information has been recorded or reproduced thus far, and a brake pulse BP for ending the movement of the objective lens to proceed to a focus control loop for the second recording layer.

By the above operation, it is started to change the spherical aberration correction amount and the coma aberration correction amount (e.g. times T1, T5 of FIG. 10) before the movement of the focus position of the microspot from the first recording layer to the second recording layer is completed, i.e. before the interlayer jump is completed (e.g. time T4 of FIG. 10) also in this embodiment similar to the first embodiment. Thus, the spherical aberration correction and the coma aberration correction suitable for the second recording layer are made upon executing the focus control for the second recording layer, wherefore there are effects that a stable focus control can be executed and the deviation of the focus control due to an interlayer jump failure can be prevented.

Further, in this embodiment, it is started to change the spherical aberration correction amount and the coma aberration correction amount (e.g. times T1, T5 of FIG. 10) before the movement of the focus position from the first recording layer to the second recording layer is started (e.g. time T6 of FIG. 10) as shown in FIG. 10. Thus, there are effects that the amount of the spherical aberration and the amount of the coma aberration when the focus position reaches the second recording layer can be more reliably reduced and a stable focus control can be more reliably executed for the second recording layer.

In this embodiment, there can be obtained an effect of being able to more reliably execute a stable focus control without being adversely affected by the spherical aberration and the coma aberration upon executing the focus control for the second recording layer by issuing the interlayer jump signal (e.g. time T6 of FIG. 10) after the changes of the spherical aberration correction amount and the coma aberration correction amount are completed (e.g. times T2, T3 of FIG. 10) as shown in FIG. 10. The issuance timing of the interlayer jump signal is not particularly limited to the above example and the movement of the focus position of the microspot may be started substantially simultaneously with the completion of the spherical and/or coma aberration correction. In this case, since the spherical aberration and/or the coma aberration in the recording layer are in a satisfactory state after the movement of the focus position, it is possible to perform a stable interlayer jump at an earlier timing.

Figure 11:
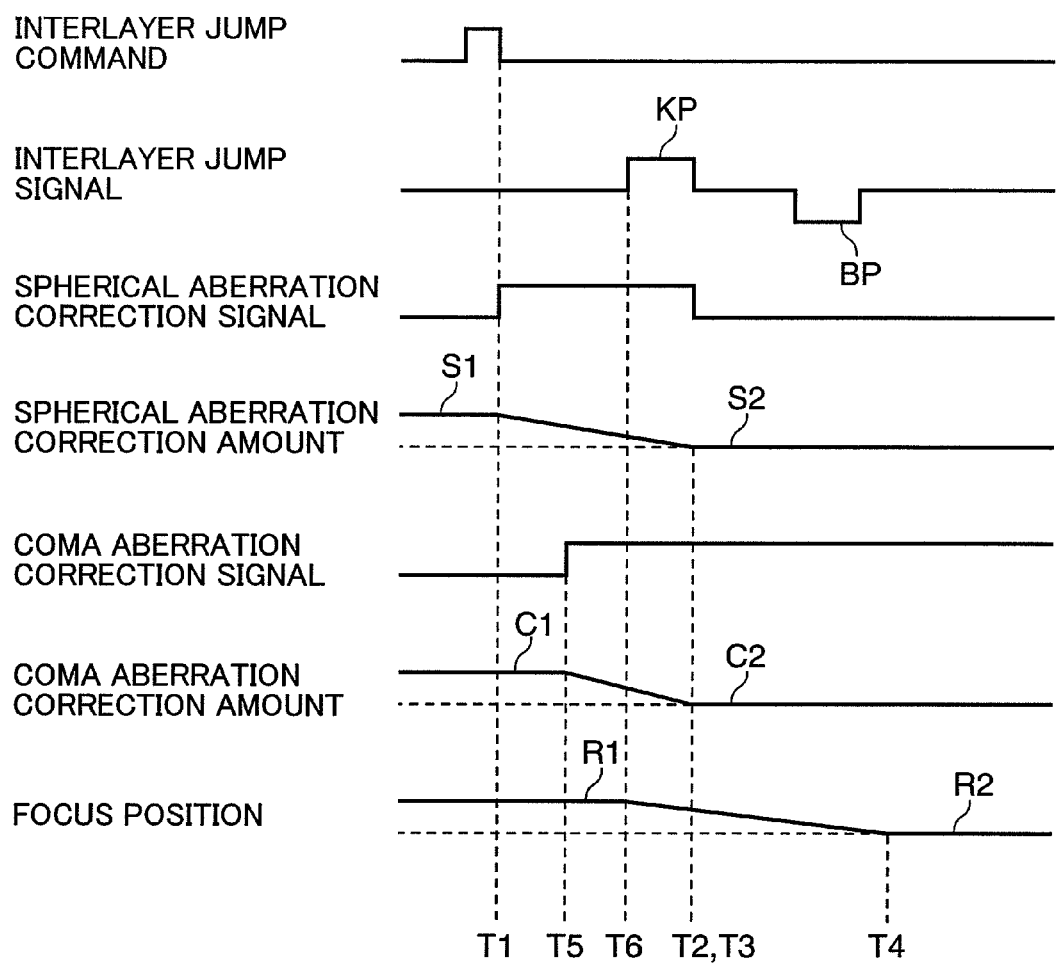
FIG. 11 is a timing chart showing other exemplary changes of various signals at the time of the interlayer jump operation of the optical disc device according to the second embodiment of the invention.

As shown in FIG. 11, the interlayer jump signal may be issued to start the movement of the focus position (e.g. time T6 of FIG. 11) before the change of the spherical aberration correction amount and the change of the coma aberration correction amount are completed (e.g. times T2, T3 of FIG. 11). In this case, a stable focus control for the second recording layer can be executed, if the change of the spherical aberration correction amount and the change of the coma aberration correction amount are completed before the movement of the focus position to the second recording layer is completed (e.g. time T4 of FIG. 11), i.e. before the entrance to the focus control loop for the second recording layer and a time required for the interlayer jump can be shortened by doing so.

Although the spherical aberration is first corrected, then the coma aberration is corrected and finally the interlayer jump is performed in this embodiment, it does not matter which of the coma aberration correction and the spherical aberration correction is performed earlier than the other or they may be performed simultaneously since it is sufficient to complete the spherical aberration correction and the coma aberration correction before the start of the focus control. However, it is desirable to keep the spherical aberration and the coma aberration in optimal states in order to maintain the stability of the focus control in the recording layer as the starting point of the interlayer jump. Thus, it is preferable to first change the spherical aberration correction amount, then change the coma aberration correction amount and finally move the focus as described in this embodiment if a time required to change the spherical aberration by a specified correction amount is longer than a time required to change the coma aberration by a specified correction amount as described in the first embodiment.

Figure 12:
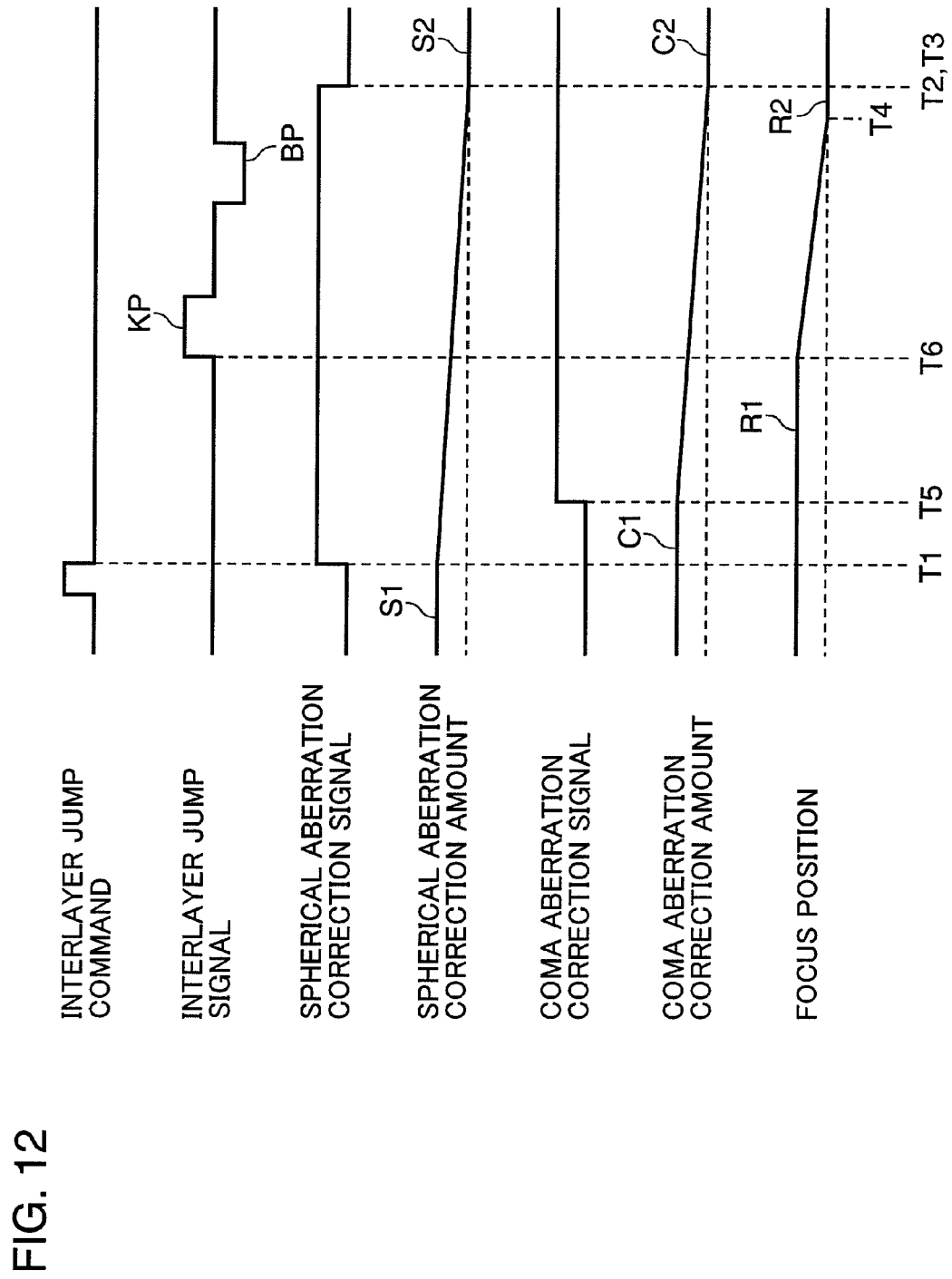
FIG. 12 is a timing chart showing other exemplary changes of various signals at the time of the interlayer jump operation of the optical disc device according to the second embodiment of the invention.

If it takes time to change the spherical aberration correction amount and the coma aberration correction amount, the movement of the focus position to the second recording layer may be completed (e.g. time T4 of FIG. 12) before the change of the spherical aberration correction amount and the change of the coma aberration correction amount are completed (e.g. times T2, T3 of FIG. 12) as shown in FIG. 12, thereby being able to obtain an effect that the time required for the interlayer jump can be more shortened.

Even if the spherical aberration correction and the coma aberration correction are completed before the start of the interlayer jump as shown in FIG. 10, the focus control and the tracking control may become unstable during a period from the completion of the spherical aberration correction and the coma aberration correction to the start of the interlayer jump if the amount of spherical aberration and/or the amount of coma aberration to be corrected is large.

Accordingly, values smaller than the amount of spherical aberration and the amount of coma aberration to be originally corrected are set as intermediate correction amounts, and corrections may be made up to the amount of spherical aberration and the amount of coma aberration to be originally corrected after corrections are temporarily made using these intermediate correction amounts.

Figure 13:
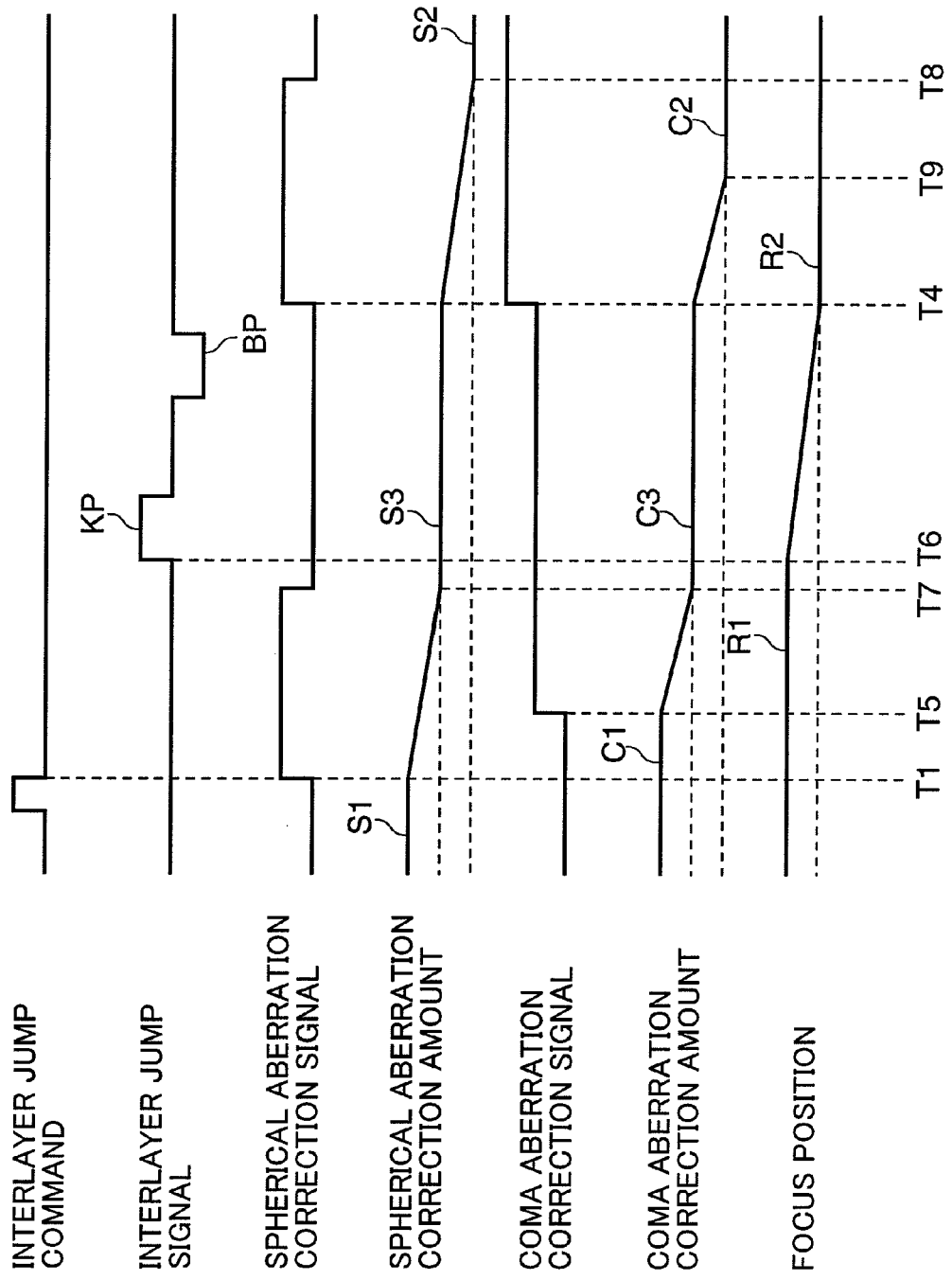
FIG. 13 is a timing chart showing other exemplary changes of various signals at the time of the interlayer jump operation of the optical disc device according to the second embodiment of the invention.

For example, as shown in FIG. 13, a half value of the amount of spherical aberration to be originally corrected may be set as an intermediate correction amount S3 of the spherical aberration, a first spherical aberration correction may be made by changing the correction amount of the spherical aberration from a spherical aberration correction amount S1 suitable for the first recording layer to the intermediate correction amount S3 of the spherical aberration, and then a second spherical aberration correction may be made by changing the spherical aberration correction amount from the intermediate correction amount S3 of the spherical aberration to a spherical aberration correction amount S2 suitable for the second recording layer. Similarly, a half value of the amount of coma aberration to be originally corrected may be set as an intermediate correction amount C3 of the coma aberration, a first coma aberration correction may be made by changing the correction amount of the coma aberration from a coma aberration correction amount C1 suitable for the first recording layer to the intermediate correction amount C3 of the coma aberration, and then a second coma aberration correction may be made by changing the coma aberration correction amount from the intermediate correction amount C3 of the coma aberration to a coma aberration correction amount C2 suitable for the second recording layer.

Specifically, the spherical aberration correction amount is changed from the spherical aberration correction amount S1 suitable for the first recording layer to the intermediate correction amount S3 of the spherical aberration (e.g. time T1 of FIG. 13) before the interlayer jump (e.g. time T6 of FIG. 13) and then the coma aberration correction amount is changed from the coma aberration correction amount C1 suitable for the first recording layer to the intermediate correction amount C3 of the coma aberration (e.g. time T5 of FIG. 13), thereby completing the first spherical aberration correction and the first coma aberration correction (e.g. time T7 of FIG. 13).

Thereafter, the interlayer jump from the first recording layer to the second recording layer is started (e.g. time T6 of FIG. 13) and the spherical aberration correction amount is changed from the intermediate correction amount S3 of the spherical aberration to the spherical aberration correction amount S2 suitable for the second recording layer and the coma aberration correction amount is changed from the intermediate correction amount C3 of the coma aberration to the coma aberration correction amount C2 suitable for the second recording layer to correct the remaining correction amounts, thereby completing the second spherical aberration correction and the second coma aberration correction (e.g. times T8, T9 of FIG. 13), after the completion of the interlayer jump (e.g. time T4 of FIG. 13).

By the above operation, the focus control and the tracking control do not become unstable before and after the interlayer jump and a stable interlayer jump can be performed. Although the spherical aberration correction amount and the coma aberration correction amount are changed in two steps in the above examples, various changes can be made, for example, by successively changing the spherical aberration correction amount and the coma aberration correction amount in three or more steps using two or more intermediate correction amounts or by changing the spherical aberration correction amount and the coma aberration correction amount in different numbers of steps without being particularly limited to the above example.

The intermediate correction amounts are also not particularly limited to the above example and a difference between the spherical aberration correction amount or the coma aberration correction amount suitable for the first recording layer and the spherical aberration correction amount or the coma aberration correction amount suitable for the second recording layer may be divided by three, four or more and the respective intermediate values may be used as two, three or more intermediate correction amounts. Differences between the spherical aberration correction amounts or the coma aberration correction amounts suitable for the first and second recording layers and the respective intermediate correction values are not particularly limited to fixed values obtained by equal division and various changes can be made, for example, by successively increasing or decreasing the differences between the intermediate correction values or using arbitrary values obtained by unequal division.

As described above, in this embodiment, by changing the spherical aberration correction amount and the coma aberration correction amount optimal for the recording layer as the starting point of the jump to the spherical aberration correction amount and the coma aberration correction amount optimal for the recording layer as the destination of the jump before the focus movement upon the interlayer jump of the multilayer optical recording medium, the respective aberration correction amounts become optimal for the recording layer as the destination of the jump before the focus movement is completed. Thus, the focus error signal becomes satisfactory and a stable interlayer jump can be performed.

Although the spherical aberration correcting portion adopts the method of moving collimator lens 24 in the optical axis direction in the above respective embodiments, an optical system for changing a degree of divergence or convergence of incident light using a concave or convex lens may be used. It may be also good to use an optical element including a phase-change layer, e.g. an optical element using a liquid crystal.

Although the optical element including the phase-change layer (liquid crystal) is used as the coma aberration correcting portion in the above respective embodiments, the coma aberration correcting portion may be constructed by an objective lens and a driver (lens actuator provided with a tilt mechanism) for inclining the objective lens. In this case, a coma aberration can be very quickly corrected, wherefore the coma aberration correction can be completed before the focus position is moved to the second recording layer even if the coma aberration correcting portion is driven immediately before or simultaneously with the focus movement or after the start of the focus movement. As a result, servo stability can be improved in the recording layer as the starting point of the focus movement, the time required for the interlayer jump can be shortened, and the coma aberration correction is completed after the focus movement. Therefore, a stable interlayer jump can be performed.

Third Embodiment

In a third embodiment is described an example of a computer provided with the optical disc device of the first embodiment.

Figure 14:
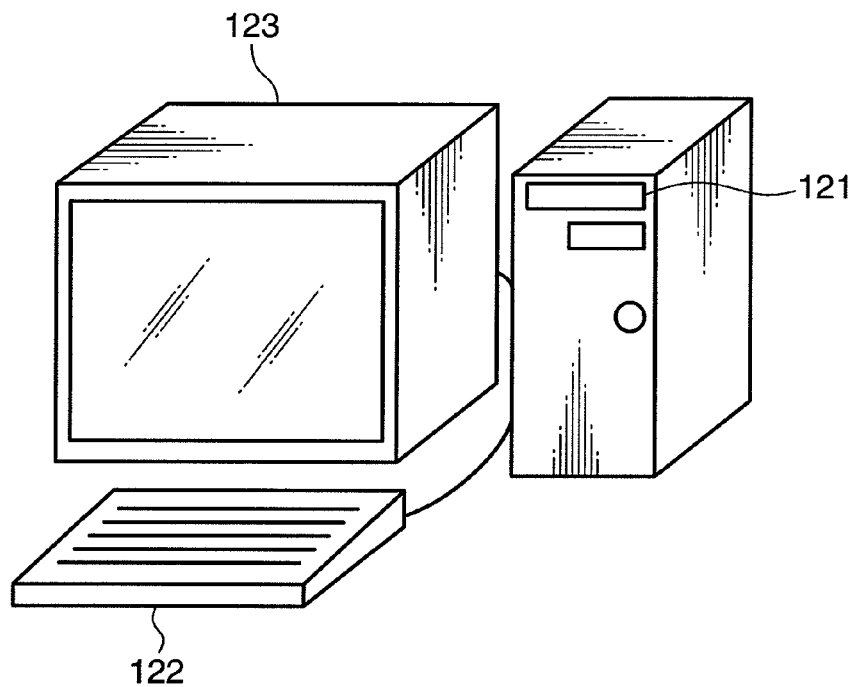
FIG. 14 is a diagram showing an example of a computer according to a third embodiment of the invention.

FIG. 14 diagrammatically shows the construction of the computer according to the third embodiment. The computer is provided with a computer main body including an optical disc device 121 of the first embodiment, a keyboard 122 used to input information, and a monitor 123 for displaying information.

The computer including the optical disc device of the above first embodiment as an external storage unit has effects that information can be stably recorded or reproduced also on or from multilayer optical recording media and it is usable in a wide range of applications. The optical disc device can backup a hard disk in the computer taking advantage of its large capacity and can enable programs and data to be exchanged with others and portable use for a user himself taking advantage of the fact that media (optical discs) are inexpensive, easy to carry around and so compatible that information can be read by other optical disc devices. Further, recording/reproduction on/from existing media such as DVDs and CDs can also be handled.

Fourth Embodiment

In a fourth embodiment is described an example of an optical disc recorder (video recording/reproducing apparatus) provided with the optical disc device of the first embodiment.

Figure 15:
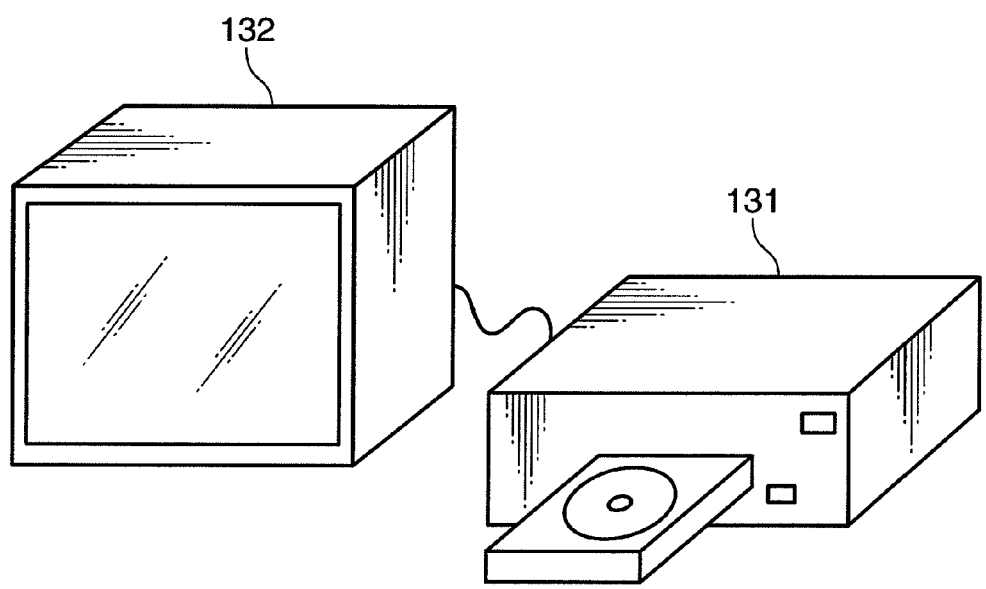
FIG. 15 is a diagram showing an example of a video recording/reproducing apparatus according to a fourth embodiment of the invention.

FIG. 15 diagrammatically shows the construction of the optical disc recorder (video recording/reproducing apparatus) according to the fourth embodiment. The optical disc recorder 131 is internally provided with the optical disc device of the first embodiment and connected to a monitor 132 for displaying recorded video images.

The optical disc recorder 131 including the optical disc device of the above first embodiment has effects that video images can be stably recorded or reproduced on or from multilayer optical recording media and it is usable in a wide range of applications. The optical disc recorder 131 can record video images on media (optical discs) and reproduce them any time a user wants. Optical discs require no rewinding after the recording and reproduction unlike tapes and enables chasing playback of reproducing a beginning part of a certain program while recording this program and simultaneous recording and reproduction of reproducing a previously recorded program while recording a certain program. Taking advantage of the fact that media (optical discs) are inexpensive, easy to carry around and so compatible that information can be read by other optical disc recorders, it is possible to exchange recorded video images with others and carry them around for personal use. Further, recording/reproduction on/from existing media such as DVDs and CDs can also be handled.

Although the optical disc recorder includes only the optical disc device, a hard disk may also be built in or a function of recording and reproducing information on and from video tapes may also be included. In this case, video images can be easily temporarily stored and backed up.

Fifth Embodiment

In a fifth embodiment is described an example of an optical disc player (video reproducing apparatus) including the optical disc device of the first embodiment.

Figure 16:
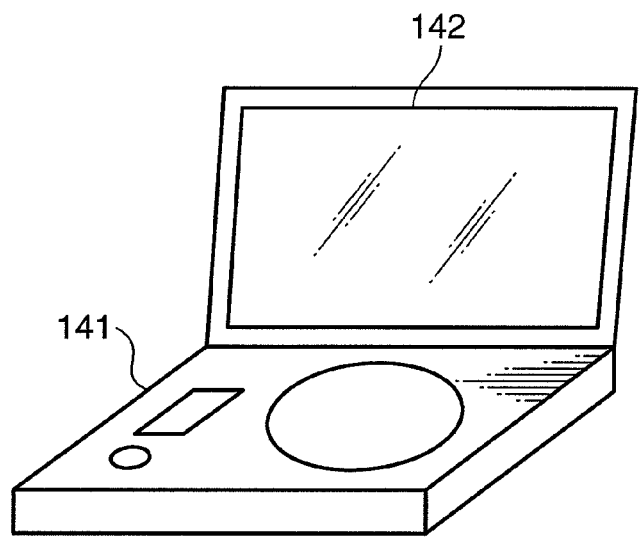
FIG. 16 is a diagram showing an example of a video reproducing apparatus according to a fifth embodiment of the invention.

FIG. 16 diagrammatically shows the construction of the optical disc player (video reproducing apparatus) according to the fifth embodiment. The optical disc player 141 including a liquid crystal monitor 142 is internally provided with the optical disc device of the first embodiment and can display video images recorded on an optical disc on the liquid crystal monitor 142. The optical disc player 141 including the optical disc device of the first embodiment has effects that video images on different types of optical discs can be stably reproduced and it is usable in a wide range of applications.

The optical disc player 141 can reproduce video images recorded on media (optical discs) any time a user wants. Optical discs require no rewinding after the reproduction unlike tapes and enable access to and reproduction of an arbitrary area of a certain video image. Further, the reproduction from existing media such as DVDs and CDs can also be handled.

Sixth Embodiment

In a sixth embodiment is described an example of a server including the optical disc device of the first embodiment.

Figure 17:
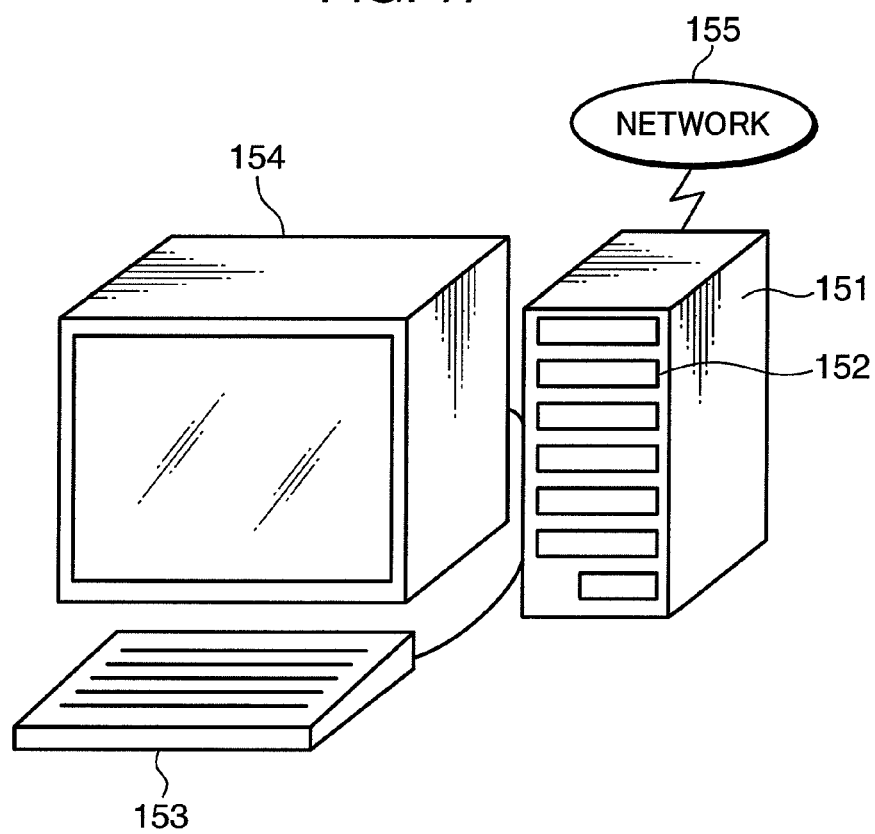
FIG. 17 is a diagram showing an example of a server according to a six embodiment of the invention.

FIG. 17 diagrammatically shows the construction of the server according to the sixth embodiment. The server is provided with a server main body 151, an optical disc device 152 of the first embodiment built in the server main body 151, a monitor 153 for displaying information and a keyboard 154 used to input information and is connected to a network 155.

The server including the optical disc device 152 of the above first embodiment as an external storage unit has effects that information can be stably recorded or reproduced on or from different types of optical discs and it is usable in a wide range of application. The optical disc device transmits information (images, sounds, video images, HTML documents, text documents, etc.) recorded on an optical disc in response to a request from the network 155, taking advantage of its large capacity, and also records information transmitted from the network in a requested area. Since information recorded on existing media such as DVDs and CDs can also be reproduced, these pieces of information can also be transmitted.

Seventh Embodiment

In a seventh embodiment is described an example of a car navigation system including the optical disc device of the first embodiment.

Figure 18:
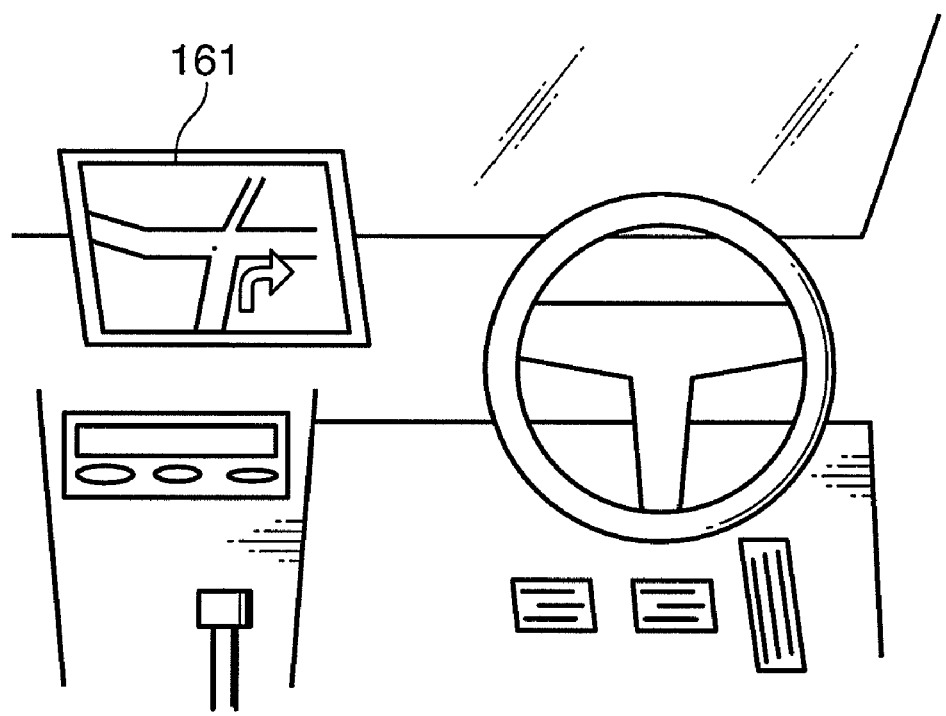
FIG. 18 is a diagram showing an example of a car navigation system according to a seventh embodiment of the invention.
Figure 19:
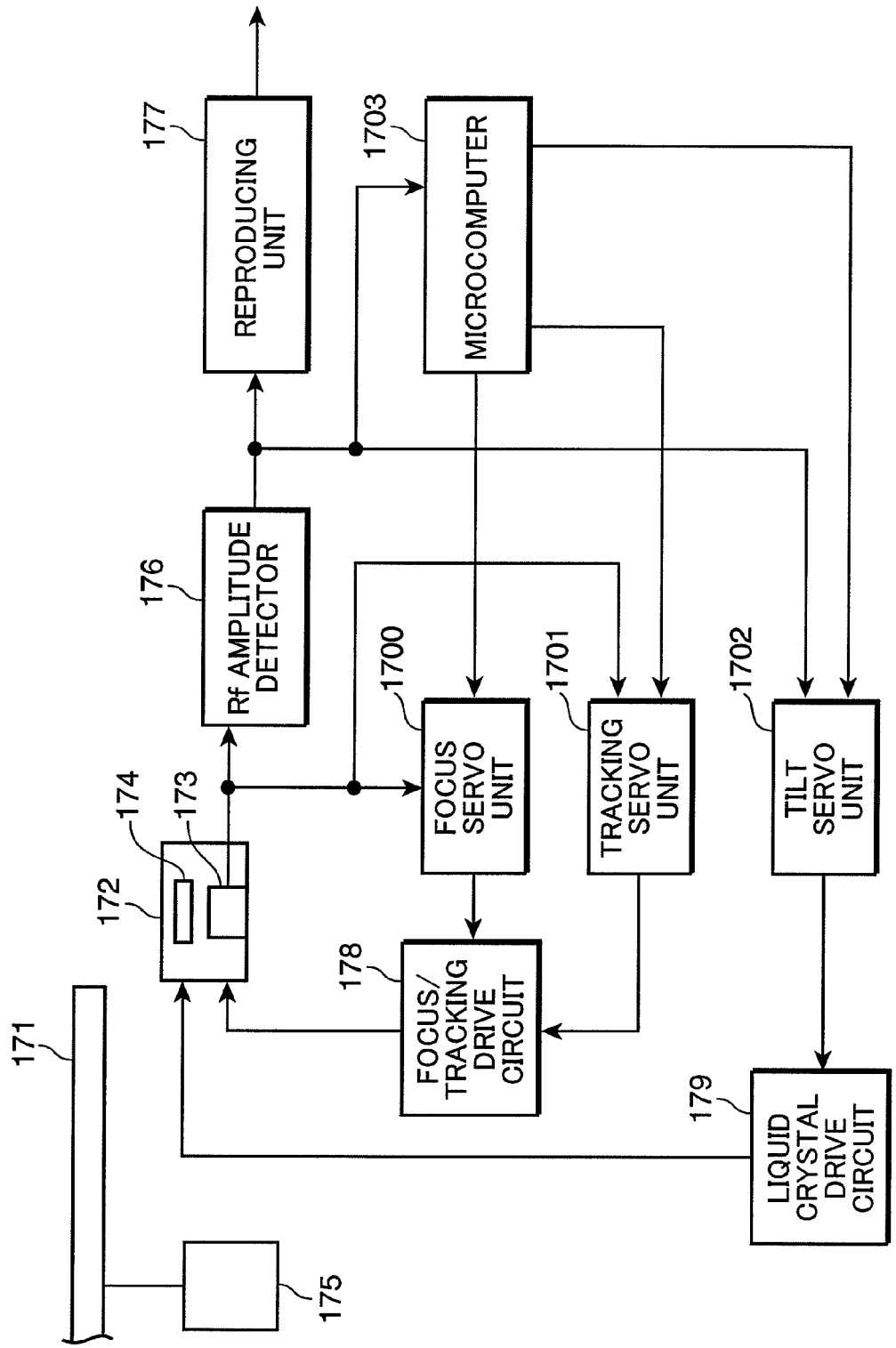
FIG. 19 is a diagram showing an example of a conventional optical disc player.

FIG. 18 diagrammatically shows the construction of the car navigation system according to the seventh embodiment. The car navigation system is internally provided with the optical disc device (not shown) of the first embodiment and used by being connected to a liquid crystal monitor 161 for displaying geographical and destination information.

The car navigation system including the optical disc device of the above first embodiment has effects that video images can be stably recorded or reproduced on or from different types of optical discs and it is usable in a wide range of application. The car navigation system determines the actual location based on map information recorded on a medium (optical disc) and information from a global positioning system (GPS), a gyroscope, a speed meter, an odometer and the like, and displays this location on the liquid crystal monitor. Further, when a destination is entered, an optimal route to the destination is determined based on the map information and road information and displays it on the liquid crystal monitor 161.

By using a large-capacity optical disc to record the map information, detailed road information can be provided by covering a wide area with one disc. Further, information such as restaurants, convenience stores, gas stations near or along roads can be provided by being simultaneously stored on the optical disc. The road information gets older as time passes and no longer conforms to the reality. However, since optical discs are compatible and inexpensive, latest information can be obtained by replacing the old disc with the one including new road information. Further, since recording/reproduction on/off existing media such as DVDs and CDs is also handled, it is also possible to watch movies and listen to music in a car.

The embodiments of the present invention are described above by way of examples. The present invention is not limited to the above embodiments and can be applied to other embodiments based on the technical concept of the present invention.

Although the optical recording media for recording information only by means of light are described in the above embodiments, it goes without saying that similar effects can be obtained for optical recording media on which information is recorded by means of light and magnetism.

Although the optical recording medium is an optical disc in the above embodiments, the present invention is also applicable to optical information recording/reproducing apparatuses for realizing similar functions for card-shaped optical recording media and the like.

The present invention is summarized as follows from the above respective embodiments. Specifically, an optical disc device according to the present invention is an optical disc device for recording or reproducing information on or from a multilayer optical recording medium including a first recording layer and a second recording layer and comprises an optical head including a light source, a condensing optical system including an objective lens for receiving a light beam emitted from the light source and forming a microspot on the multilayer optical recording medium, a photodetector for receiving the light beam reflected by the multilayer optical recording medium and outputting an electrical signal corresponding to the amount of light and a coma aberration correcting portion for correcting a coma aberration of the condensing optical system; and a controller for controlling the condensing optical system and the coma aberration correcting portion, wherein the controller controls the condensing optical system and the coma aberration correcting portion so that the correction of the coma aberration from a value suitable for the first recording layer to a value specified for the second recording layer is started before a movement of a focus position of the microspot from the first recording layer to the second recording layer is completed.

In this optical disc device, the multilayer optical recording medium includes at least the first recording layer and the second recording layer, the correction of the coma aberration is started by changing a coma aberration correction amount from the value suitable for the first recording layer to the value specified for the second recording layer before the movement of the focus position of the microspot from the first recording layer to the second recording layer is completed. Thus, an optical disc device can be realized which can make a coma aberration in a recording layer as a destination of a movement of a focus position satisfactory, obtain a good focus error signal and perform a stable interlayer jump.

The controller preferably substantially simultaneously starts the movement of the focus position of the microspot and the correction of the coma aberration. In this case, a time required for the interlayer jump can be shortened.

The controller may start the correction of the coma aberration before the movement of the focus position of the microspot is started. In this case, since the change of the coma aberration is started before the movement of the focus position, the coma aberration is satisfactory in the recording layer as the destination of the movement of the focus position, a good focus error signal can be obtained and a stable interlayer jump can be performed.

The controller preferably starts the movement of the focus position of the microspot after the correction of the coma aberration is completed. In this case, a stable interlayer jump can be performed since the coma aberration is in a satisfactory state in the recording layer as the destination of the movement of the focus position.

The controller may start the movement of the focus position of the microspot substantially simultaneously with the completion of the correction of the coma aberration. In this case, the interlayer jump can be performed stably and at an earlier timing since the coma aberration is in a satisfactory state in the recording layer as the destination of the movement of the focus position.

The controller preferably completes the correction of the coma aberration during the movement of the focus position of the microspot. In this case, the time required for the interlayer jump can be shortened.

The controller preferably completes the movement of the focus position of the microspot before the correction of the coma aberration is completed. In this case, the time required for the interlayer jump can be further shortened.

The controller may substantially simultaneously complete the movement of the focus position of the microspot and the correction of the coma aberration. In this case, the time required for the interlayer jump can be shortened.

A change amount of the coma aberration correction amount is preferably a difference between a coma aberration correction amount suitable for the first recording layer and that suitable for the second recording layer which are learned and obtained when the multilayer optical recording medium is inserted into the optical disc device or the optical disc device is turned on. In this case, a stable interlayer jump can be performed since the coma aberration can be accurately corrected.

It is preferable that the multilayer optical recording medium includes three or more recording layers; and that the controller moves the focus position of the microspot over one or more recording layers. In this case, a stable interlayer jump can be performed even if aberrations largely change.

It is preferable that a wavelength of the light source is about 405 nm; and that a numerical aperture of the objective lens is about 0.85. In this case, even for large-capacity multilayer optical recording media, servo stability in the recording layer as the starting point of the focus movement can be improved, the time required for the interlayer jump can be shortened and the coma aberration correction is already completed after the focus is moved. Therefore, a stable interlayer jump can be performed.

It is preferable that the optical head further includes a spherical aberration correcting portion for correcting a spherical aberration of the condensing optical system by changing a degree of divergence of light in the condensing optical system; and that the controller controls the spherical aberration correcting portion. In this case, a stable interlayer jump can be performed since the spherical aberration can be accurately corrected.

The controller preferably substantially simultaneously starts the correction of the spherical aberration and the correction of the coma aberration. In this case, the time required for the interlayer jump can be shortened.

The controller may start the correction of the coma aberration after the correction of the spherical aberration is started. In this case, stability can be maintained in the recording layer as the starting point of the movement of the focus position.

A change amount of the spherical aberration correction amount preferably corresponds to the thickness of a standard intermediate layer between the first and second recording layers. In this case, no time is necessary for learning and a time required for the start-up of the device can be shortened.

A change amount of the spherical aberration correction amount is preferably a difference between a spherical aberration correction amount suitable for the first recording layer and that suitable for the second recording layer which are learned and obtained when the multilayer optical recording medium is inserted into the optical disc device or when the optical disc device is turned on. In this case, a stable interlayer jump can be performed since the spherical aberration can be accurately corrected.

A video recording apparatus according to the present invention comprises any one of the above optical disc devices and reproduces a video image from the multilayer optical recording medium. This video recording apparatus is compatible with multilayer optical recording media.

A server according to the present invention comprises any one of the above optical disc devices as an external storage unit. This server is compatible with multilayer optical recording media.

A car navigation system according to the present invention comprises any one of the above optical disc devices as an external storage unit. This car navigation system is compatible with multilayer optical recording media.

A computer according to the present invention comprises any one of the above optical disc devices as an external storage unit. This computer is compatible with multilayer optical recording media.

A video recording/reproducing apparatus according to the present invention comprises any one of the above optical disc devices, records a video image on the multilayer optical recording medium and reproduces a video image from the multilayer optical recording medium. This video recording/reproducing apparatus is compatible with multilayer optical recording media.

As described above, the above computer, video recording/reproducing apparatus, video reproducing apparatus, server and car navigation system having a good recording/reproducing performance for multilayer optical recording media can be realized by using any one of the above the optical disc devices.

An integrated circuit according to the present invention is an integrated circuit used in an optical disc device for recording or reproducing information on or from a multilayer optical recording medium including a first recording layer and a second recording layer using an optical head including a light source, a condensing optical system including an objective lens for receiving a light beam emitted from the light source and forming a microspot on the multilayer optical recording medium, a photodetector for receiving the light beam reflected by the multilayer optical recording medium and outputting an electrical signal corresponding to the amount of light and a coma aberration correcting portion for correcting a coma aberration of the condensing optical system, and comprises a first controller for controlling the condensing optical system and a second controller for controlling the coma aberration correcting portion, wherein the first and second controllers control the condensing optical system and the coma aberration correcting portion so that the correction of the coma aberration from a value suitable for the first recording layer to a value specified for the second recording layer is started before a movement of the microspot from the first recording layer to the second recording layer is completed.

With this integrated circuit, an optical disc device can be realized which can make a coma aberration in a recording layer as a destination of a movement of a focus position satisfactory, obtain a good focus error signal and perform a stable interlayer jump.

A recording/reproducing method according to the present invention is a recording/reproducing method for recording or reproducing information on a multilayer optical recording medium including a first recording layer and a second recording layer using an optical head including a light source, a condensing optical system including an objective lens for receiving a light beam emitted from the light source and forming a microspot on the multilayer optical recording medium, a photodetector for receiving the light beam reflected by the multilayer optical recording medium and outputting an electrical signal corresponding to the amount of light and a coma aberration correcting portion for correcting a coma aberration of the condensing optical system, and comprises a first step of moving a focus position of the microspot from the first recording layer to the second recording layer; and a second step of starting the correction of the coma aberration from a value suitable for the first recording layer to a value specified for the second recording layer before a movement of the microspot from the first recording layer to the second recording layer is completed.

In this recording/reproducing method, the coma aberration in the recording layer as a destination of the movement of the focus position becomes satisfactory, a good focus error signal can be obtained and a stable interlayer jump can be performed.

INDUSTRIAL APPLICABILITY

An optical disc device according to the present invention can realize a good recording/reproducing performance on/from multilayer optical recording media and is also applicable to a computer, a video recording/reproducing apparatus, a video reproducing apparatus, a server and a car navigation system.

What is claimed is:
1. An optical disc device for recording or reproducing information on or from a multilayer optical recording medium including a first recording layer and a second recording layer, the optical disc device comprising:
an optical head including a light source, a condensing optical system including an objective lens for receiving a light beam emitted from the light source and forming a microspot on the multilayer optical recording medium, a photodetector for receiving the light beam reflected by the multilayer optical recording medium and outputting an electrical signal corresponding to the amount of light, a spherical aberration correcting portion for correcting a spherical aberration of the condensing optical system by changing a degree of divergence of light in the condensing optical system, and a coma aberration correcting portion for correcting a coma aberration of the condensing optical system; and a controller for controlling the condensing optical system, the spherical aberration correcting portion, and the coma aberration correcting portion, wherein the controller controls the condensing optical system and the coma aberration correcting portion so that the correction of the coma aberration from a value suitable for the first recording layer to a value specified for the second recording layer is started before a movement of a focus position of the microspot from the first recording layer to the second recording layer is completed, and wherein the controller substantially simultaneously starts the correction of the spherical aberration and the correction of the coma aberration.

2. An optical disc device according to claim 1, wherein the controller substantially simultaneously starts the movement of the focus position of the microspot and the correction of the coma aberration.

3. An optical disc device according to claim 1, wherein the controller starts the correction of the coma aberration before the movement of the focus position of the microspot is started.

4. An optical disc device according to claim 3, wherein the controller starts the movement of the focus position of the microspot after the correction of the coma aberration is completed.

5. An optical disc device according to claim 3, wherein the controller starts the movement of the focus position of the microspot substantially simultaneously with the completion of the correction of the coma aberration.

6. An optical disc device according to claim 1, wherein the controller completes the correction of the coma aberration during the movement of the focus position of the microspot.

7. An optical disc device according to claim 1, wherein the controller completes the movement of the focus position of the microspot before the correction of the coma aberration is completed.

8. An optical disc device according to claim 1, wherein the controller substantially simultaneously completes the movement of the focus position of the microspot and the correction of the coma aberration.

9. An optical disc device according to claim 1, wherein a change amount of the coma aberration correction amount is a difference between a coma aberration correction amount suitable for the first recording layer and that suitable for the second recording layer which are learned and obtained when the multilayer optical recording medium is inserted into the optical disc device or the optical disc device is turned on.

10. An optical disc device according to claim 1,
wherein the multilayer optical recording medium includes three or more recording layers, and
wherein the controller moves the focus position of the microspot over one or more recording layers.

11. An optical disc device according to claim 1,
wherein a wavelength of the light source is about 405 nm, and
wherein a numerical aperture of the objective lens is about 0.85.

12. An optical disc device for recording or reproducing information on or from a multilayer optical recording medium including a first recording layer and a second recording layer, the optical disc device comprising:

an optical head including a light source, a condensing optical system including an objective lens for receiving a light beam emitted from the light source and forming a microspot on the multilayer optical recording medium, a photodetector for receiving the light beam reflected by the multilayer optical recording medium and outputting an electrical signal corresponding to the amount of light, a spherical aberration correcting portion for correcting a spherical aberration of the condensing optical system by changing a degree of divergence of light in the condensing optical system, and a coma aberration correcting portion for correcting a coma aberration of the condensing optical system; and a controller for controlling the condensing optical system, the spherical aberration correcting portion, and the coma aberration correcting portion, wherein the controller controls the condensing optical system and the coma aberration correcting portion so that the correction of the coma aberration from a value suitable for the first recording layer to a value specified for the second recording layer is started before a movement of a focus position of the microspot from the first recording layer to the second recording layer is completed, and wherein the controller starts the correction of the coma aberration after the correction of the spherical aberration is started and before the correction of the spherical aberration is completed.

13. An optical disc device according to claim 1, wherein a change amount of the spherical aberration correction amount corresponds to the thickness of a standard intermediate layer between the first and second recording layers.

14. An optical disc device according to claim 1, wherein a change amount of the spherical aberration correction amount is a difference between a spherical aberration correction amount suitable for the first recording layer and that suitable for the second recording layer which are learned and obtained when the multilayer optical recording medium is inserted into the optical disc device or when the optical disc device is turned on.

15. A video recording apparatus, comprising an optical disc device according to claim 1 as an external storage unit and adapted to reproduce a video image from the multilayer optical recording medium.

16. A server, comprising an optical disc device according to claim 1 as an external storage unit.

17. A car navigation system, comprising an optical disc device according to claim 1 as an external storage unit.

18. An integrated circuit used in an optical disc device for recording or reproducing information on or from a multilayer optical recording medium including a first recording layer and a second recording layer using an optical head including a light source, a condensing optical system including an objective lens for receiving a light beam emitted from the light source and forming a microspot on the multilayer optical recording medium, a photodetector for receiving the light beam reflected by the multilayer optical recording medium and outputting an electrical signal corresponding to the amount of light, a spherical aberration correcting portion for correcting a spherical aberration of the condensing optical system by changing a degree of divergence of light in the condensing optical system, and a coma aberration correcting portion for correcting a coma aberration of the condensing optical system, the integrated circuit comprising:

a first controller for controlling the condensing optical system; and a second controller for controlling the spherical aberration correcting portion and the coma aberration correcting portion, wherein the first and second controllers control the condensing optical system and the coma aberration correcting portion so that the correction of the coma aberration from a value suitable for the first recording layer to a value specified for the second recording layer is started before a movement of the microspot from the first recording layer to the second recording layer is completed, and wherein the second controller substantially simultaneously starts the correction of the spherical aberration and the correction of the coma aberration.

19. A recording/reproducing method for recording or reproducing information on a multilayer optical recording medium including a first recording layer and a second recording layer using an optical head including a light source, a condensing optical system including an objective lens for receiving a light beam emitted from the light source and forming a microspot on the multilayer optical recording medium, a photodetector for receiving the light beam reflected by the multilayer optical recording medium and outputting an electrical signal corresponding to the amount of light, a spherical aberration correcting portion for correcting a spherical aberration of the condensing optical system by changing a degree of divergence of light in the condensing optical system, and a coma aberration correcting portion for correcting a coma aberration of the condensing optical system, the recording/reproducing method comprising:

a first step of moving a focus position of the microspot from the first recording layer to the second recording layer; and a second step of starting the correction of the coma aberration from a value suitable for the first recording layer to a value specified for the second recording layer before a movement of the microspot from the first recording layer to the second recording layer is completed and substantially simultaneously starting the correction of the spherical aberration and the correction of the coma aberration.

* * * * *